United States Patent
Babcock et al.

(10) Patent No.: US 6,608,155 B2
(45) Date of Patent: *Aug. 19, 2003

(54) METAL HALIDE SOLID ACIDS AND SUPPORTED METAL HALIDES AS CATALYSTS FOR THE PREPARATION OF HYDROCARBON RESINS

(75) Inventors: Laura M. Babcock, Hockessin, DE (US); Dennis G. Morrell, Hockessin, DE (US)

(73) Assignee: Eastman Chemical Resins, Inc., Kingsport, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,879

(22) Filed: Jan. 7, 1998

(65) Prior Publication Data

US 2002/0183465 A1 Dec. 5, 2002

Related U.S. Application Data

(60) Provisional application No. 60/035,797, filed on Jan. 10, 1997, provisional application No. 60/034,579, filed on Jan. 9, 1997, and provisional application No. 60/035,217, filed on Jan. 8, 1997.

(51) Int. Cl.[7] .......................... C08F 112/08; B01J 27/10
(52) U.S. Cl. .................. 526/237; 526/130; 526/346; 585/10; 585/11; 585/12; 502/226; 502/227; 502/229; 502/231
(58) Field of Search .................. 526/130, 273; 585/10, 11, 12

(56) References Cited

U.S. PATENT DOCUMENTS

| | | | |
|---|---|---|---|
| 2,301,966 A | 11/1942 | Michel et al. |
| 2,507,864 A | 5/1950 | Moore et al. |
| 2,559,576 A | 7/1951 | Johnstone |
| 2,626,290 A | 1/1953 | Fell et al. |
| 2,626,291 A | 1/1953 | Betts |
| 2,632,777 A | 3/1953 | Pines |
| 2,642,402 A | 6/1953 | Corner et al. |
| 2,694,686 A | 11/1954 | Reeves et al. |
| 2,721,889 A | 10/1955 | Murphree et al. |
| 2,728,804 A | 12/1955 | Mueller |
| 2,732,398 A | 1/1956 | Brice et al. |
| 2,734,046 A | 2/1956 | Nelson et al. |
| 2,739,143 A | 3/1956 | Goering et al. |
| 2,744,084 A | 5/1956 | Arey |
| 2,745,890 A | 5/1956 | Cahn |
| 2,748,090 A | 5/1956 | Watkins |
| 2,751,331 A | 6/1956 | Alpert et al. |
| 2,753,325 A | 7/1956 | Banes et al. |
| 2,753,382 A | 7/1956 | Hamner |
| 2,758,143 A | 8/1956 | Arundale et al. |
| 2,766,311 A | 10/1956 | Mayer et al. |
| 2,766,312 A | 10/1956 | Serniuk |
| 2,767,234 A | 10/1956 | Dauber et al. |
| 2,772,317 A | 11/1956 | Smith et al. |
| 2,773,051 A | 12/1956 | Leary |
| 2,775,577 A | 12/1956 | Schneider et al. |
| 2,778,804 A | 1/1957 | Corner et al. |
| 2,779,753 A | 1/1957 | Garabrant et al. |
| 2,786,878 A | 3/1957 | Arundale et al. |
| 2,816,944 A | 12/1957 | Muessig et al. |
| 2,831,037 A | 4/1958 | Schmerling |
| 2,833,746 A | 5/1958 | Haefner |
| 2,849,428 A | 8/1958 | Small et al. |
| 2,852,580 A | 9/1958 | Geiser |
| 2,878,240 A | 3/1959 | Schmerling |
| 2,906,793 A | 9/1959 | Rowe et al. |
| 2,914,517 A | 11/1959 | Schmerling |
| 2,931,792 A | 4/1960 | Aries |
| 2,938,018 A | 5/1960 | Schmerling |
| 2,945,845 A | 7/1960 | Schmerling |
| 2,976,338 A | 3/1961 | Thomas |
| 2,987,511 A | 6/1961 | Arrigo |
| 3,000,868 A | 9/1961 | Powers |
| 3,006,905 A | 10/1961 | Geiser |
| 3,006,906 A | 10/1961 | Geiser |
| 3,017,400 A | 1/1962 | Bloch |
| 3,024,226 A | 3/1962 | Nolan et al. |
| 3,037,970 A | 6/1962 | Geiser |
| 3,054,787 A | 9/1962 | D'Alelio |
| 3,109,041 A | 10/1963 | Child et al. |
| 3,112,350 A | 11/1963 | Bielawski et al. |

(List continued on next page.)

FOREIGN PATENT DOCUMENTS

| | | |
|---|---|---|
| DE | 1963684 | 8/1970 |
| DE | 2836982 | 3/1979 |
| EP | 0090569 | 10/1983 |

(List continued on next page.)

OTHER PUBLICATIONS

Derwent Abstract No. 001575902 WPI Acc No. 76–10285X/06 (Mar. 17, 1976).
Patent Abstracts of Japan, vol. 6, No. 250 (C–139) Dec. 9, 1982.

(List continued on next page.)

Primary Examiner—Caixia Lu
(74) Attorney, Agent, or Firm—Polly C. Owen; Betty J. Boshears; Bernard J. Graves, Jr.

(57) ABSTRACT

Supported metal halides and metal halide solid acids are used as catalysts for the polymerization of a feed stream containing at least one of pure monomer, C5 monomers, and C9 monomers to produce hydrocarbon resins. Freely-associated water may be removed from the solid acid catalyst prior to use. Resins with softening points (Ring and Ball) in the range of about 5° C. to 170° C. can be prepared. These catalysts offer advantages over the traditional Friedel-Crafts polymerization catalysts since the acid sites are an integral part of the solid. The solid acid catalysts are relatively nonhazardous, reusable catalysts which eliminate or at least reduce contamination of the resulting resin products with acid residues or by-products.

20 Claims, 4 Drawing Sheets

U.S. PATENT DOCUMENTS

| | | |
|---|---|---|
| 3,113,165 A | 12/1963 | Bloch |
| 3,128,318 A | 4/1964 | Meisinger et al. |
| 3,133,127 A | 5/1964 | Heisler et al. |
| 3,136,729 A | 6/1964 | Clark |
| 3,154,595 A | 10/1964 | Donaldson et al. |
| 3,166,545 A | 1/1965 | Pezdirtz |
| 3,179,649 A | 4/1965 | Feay et al. |
| 3,190,936 A | 6/1965 | Child et al. |
| 3,190,938 A | 6/1965 | Edwards |
| 3,221,001 A | 11/1965 | Kirshenbaum et al. |
| 3,244,767 A | 4/1966 | Nixon |
| 3,244,768 A | 4/1966 | Holt |
| 3,248,341 A | 4/1966 | Louvar |
| 3,347,676 A | 10/1967 | Cripps |
| 3,364,191 A | 1/1968 | Donaldson et al. |
| 3,374,285 A | 3/1968 | Henke et al. |
| 3,383,378 A | 5/1968 | Bloch et al. |
| 3,418,304 A | 12/1968 | Langer et al. |
| 3,420,809 A | 1/1969 | Tornqvist |
| 3,426,007 A | 2/1969 | Kennedy |
| 3,426,089 A | 2/1969 | De Rosset |
| 3,427,275 A | 2/1969 | Davis et al. |
| 3,457,189 A | 7/1969 | De Rosset |
| 3,463,744 A | 8/1969 | Mitsche |
| 3,464,929 A | 9/1969 | Mitsche |
| 3,472,791 A | 10/1969 | Vesely |
| 3,497,568 A | 2/1970 | Stepanek et al. |
| 3,499,877 A | 3/1970 | Arnold |
| 3,515,769 A | 6/1970 | Fishel |
| 3,555,107 A | 1/1971 | Estes |
| 3,577,400 A | 5/1971 | Judy |
| 3,586,616 A | 6/1971 | Kropp |
| 3,597,403 A | 8/1971 | Ofstead |
| 3,597,406 A | 8/1971 | Calderon |
| 3,607,959 A | 9/1971 | Estes et al. |
| 3,609,098 A | 9/1971 | Brown |
| 3,624,060 A | 11/1971 | Judy |
| 3,630,981 A | 12/1971 | Finfinger et al. |
| 3,631,212 A | 12/1971 | Schmerling |
| 3,640,981 A | 2/1972 | Davis |
| 3,644,220 A | 2/1972 | Kearby |
| 3,652,487 A | 3/1972 | Ward |
| 3,652,706 A | 3/1972 | Saines et al. |
| 3,652,707 A | 3/1972 | Saines et al. |
| 3,657,205 A | 4/1972 | Throckmorton |
| 3,657,208 A | 4/1972 | Judy |
| 3,661,870 A | 5/1972 | Bullard |
| 3,669,947 A | 6/1972 | Kahn et al. |
| 3,689,434 A | 9/1972 | Suggitt et al. |
| 3,689,471 A | 9/1972 | Judy |
| 3,692,694 A | 9/1972 | Kravitz et al. |
| 3,692,695 A | 9/1972 | Suggitt et al. |
| 3,692,696 A | 9/1972 | Kravitz et al. |
| 3,692,697 A | 9/1972 | Kravitz et al. |
| 3,692,872 A | 9/1972 | Calderon et al. |
| 3,711,425 A | 1/1973 | Suggitt et al. |
| 3,717,586 A | 2/1973 | Suggitt et al. |
| 3,721,632 A * | 3/1973 | Miller et al. |
| 3,734,866 A | 5/1973 | Aylies et al. |
| 3,746,696 A | 7/1973 | Judy |
| 3,753,961 A | 8/1973 | St. Cyr |
| 3,753,962 A | 8/1973 | Restaino |
| 3,772,255 A | 11/1973 | Bell |
| 3,772,401 A | 11/1973 | Stepanek |
| 3,799,913 A | 3/1974 | Wheeler et al. |
| 3,801,559 A | 4/1974 | Ofstead et al. |
| 3,842,019 A | 10/1974 | Kropp |
| 3,867,361 A | 2/1975 | Calderon et al. |
| 3,888,789 A | 6/1975 | Dombro et al. |
| 3,895,081 A * | 7/1975 | Aikawa et al. ............ 260/82.1 |
| 3,926,882 A | 12/1975 | Henk et al. |
| 3,929,737 A | 12/1975 | Tazuma et al. |
| 3,932,332 A | 1/1976 | Douglas et al. |
| 3,932,553 A | 1/1976 | Robert |
| 3,935,179 A | 1/1976 | Ofstead |
| 3,943,116 A | 3/1976 | Bell |
| 3,945,986 A | 3/1976 | Ofstead |
| 3,956,180 A | 5/1976 | Cavitt |
| 3,956,250 A | 5/1976 | Campbell et al. |
| 3,975,336 A | 8/1976 | Lal et al. |
| 3,980,577 A | 9/1976 | Hotta |
| 3,987,109 A | 10/1976 | Brennan et al. |
| 3,992,322 A | 11/1976 | Dombro et al. |
| 3,997,471 A | 12/1976 | Ofstead |
| 4,009,228 A | 2/1977 | Tazuma et al. |
| 4,010,113 A | 3/1977 | Ofstead |
| 4,013,736 A | 3/1977 | Woo |
| 4,020,254 A | 4/1977 | Ofstead |
| 4,028,272 A | 6/1977 | Throckmorton |
| 4,038,471 A | 7/1977 | Castner |
| 4,048,262 A | 9/1977 | Haag et al. |
| 4,062,801 A | 12/1977 | Burton et al. |
| 4,063,011 A | 12/1977 | Campbell et al. |
| 4,064,335 A | 12/1977 | Lal et al. |
| 4,068,062 A | 1/1978 | Lepert |
| 4,075,404 A | 2/1978 | Douglas et al. |
| 4,105,843 A | 8/1978 | Iwase et al. |
| 4,108,944 A | 8/1978 | Tazuma et al. |
| 4,127,710 A | 11/1978 | Hsieh |
| 4,130,701 A | 12/1978 | Lepert et al. |
| 4,133,801 A | 1/1979 | Morimatsu et al. |
| 4,137,390 A | 1/1979 | Ofstead |
| 4,153,771 A | 5/1979 | Bullard et al. |
| 4,168,357 A | 9/1979 | Throckmorton et al. |
| 4,171,414 A | 10/1979 | Wagensommer et al. |
| 4,172,932 A | 10/1979 | Ofstead et al. |
| 4,205,160 A | 5/1980 | Gloth et al. |
| 4,217,409 A | 8/1980 | Inoue et al. |
| 4,230,840 A | 10/1980 | Katayama et al. |
| 4,233,139 A | 11/1980 | Murrell et al. |
| 4,239,874 A | 12/1980 | Ofstead et al. |
| 4,245,075 A | 1/1981 | Lepert |
| 4,248,735 A | 2/1981 | McDaniel et al. |
| 4,294,724 A | 10/1981 | McDaniel |
| 4,296,001 A | 10/1981 | Hawley |
| 4,299,731 A | 11/1981 | McDaniel et al. |
| 4,301,034 A | 11/1981 | McDaniel |
| 4,301,227 A | 11/1981 | Hotta et al. |
| 4,328,090 A | 5/1982 | Stuckey, Jr. et al. |
| 4,339,559 A | 7/1982 | McDaniel |
| 4,345,055 A | 8/1982 | Hawley |
| 4,347,158 A | 8/1982 | Kaus et al. |
| 4,359,406 A | 11/1982 | Fung |
| 4,363,746 A | 12/1982 | Capshew |
| 4,364,840 A | 12/1982 | McDaniel et al. |
| 4,364,841 A | 12/1982 | McDaniel et al. |
| 4,364,854 A | 12/1982 | McDaniel et al. |
| 4,367,352 A | 1/1983 | Watts, Jr. et al. |
| 4,368,303 A | 1/1983 | McDaniel |
| 4,378,306 A | 3/1983 | McDaniel et al. |
| 4,382,022 A | 5/1983 | McDaniel |
| 4,384,086 A | 5/1983 | McDaniel et al. |
| 4,391,737 A | 7/1983 | Bell |
| 4,395,578 A | 7/1983 | Larkin |
| 4,397,765 A | 8/1983 | McDaniel |
| 4,403,088 A | 9/1983 | Smith et al. |
| RE31,443 E | 11/1983 | McDaniel et al. |
| 4,415,715 A | 11/1983 | Bell |
| 4,419,268 A | 12/1983 | McDaniel |
| 4,422,957 A | 12/1983 | Kaus et al. |
| 4,424,139 A | 1/1984 | McDaniel et al. |

| | | | | | |
|---|---|---|---|---|---|
| 4,424,320 A | 1/1984 | McDaniel | 4,954,562 A | 9/1990 | Anderson |
| 4,425,226 A | 1/1984 | Reusser et al. | 4,956,420 A | 9/1990 | White et al. |
| 4,425,257 A | 1/1984 | Miro et al. | 4,957,889 A | 9/1990 | McCauley |
| 4,434,243 A | 2/1984 | Martin | 4,982,045 A | 1/1991 | Chen et al. |
| 4,434,280 A | 2/1984 | McDaniel et al. | 4,987,200 A | 1/1991 | Datta et al. |
| 4,434,313 A * | 2/1984 | Langer, Jr. | 5,008,468 A | 4/1991 | King et al. |
| 4,436,948 A * | 3/1984 | Bobsein | 5,017,662 A | 5/1991 | White |
| 4,439,543 A | 3/1984 | McDaniel et al. | 5,064,802 A | 11/1991 | Stevens et al. |
| 4,442,274 A | 4/1984 | McDaniel et al. | 5,073,531 A | 12/1991 | Witt |
| 4,442,275 A | 4/1984 | Martin | 5,075,394 A | 12/1991 | McDaniel et al. |
| 4,444,904 A | 4/1984 | Ryu | 5,081,086 A | 1/1992 | Wilcher et al. |
| 4,444,962 A | 4/1984 | McDaniel et al. | 5,110,778 A | 5/1992 | Olah |
| 4,444,966 A | 4/1984 | McDaniel | 5,113,034 A | 5/1992 | Soled et al. |
| 4,444,968 A | 4/1984 | McDaniel et al. | 5,139,761 A | 8/1992 | Nair et al. |
| 4,454,367 A | 6/1984 | Sakurada et al. | 5,171,791 A | 12/1992 | Marchand et al. |
| 4,463,212 A * | 7/1984 | Imai | 5,177,288 A | 1/1993 | Chen |
| 4,513,166 A | 4/1985 | Sakurada et al. | 5,190,844 A | 3/1993 | Yabuuchi et al. |
| 4,520,121 A | 5/1985 | Inkrott et al. | 5,191,132 A | 3/1993 | Patsidis et al. |
| 4,520,222 A | 5/1985 | Reusser et al. | 5,191,140 A | 3/1993 | Akatsu et al. |
| 4,536,358 A | 8/1985 | Welsh et al. | 5,198,512 A | 3/1993 | Jackson et al. |
| 4,547,474 A | 10/1985 | Olah | 5,198,563 A | 3/1993 | Reagen et al. |
| 4,547,479 A | 10/1985 | Johnson et al. | 5,200,379 A | 4/1993 | McDaniel et al. |
| 4,555,496 A | 11/1985 | Agapiou et al. | 5,206,314 A | 4/1993 | Mitchell et al. |
| 4,558,170 A | 12/1985 | Chen et al. | 5,225,493 A | 7/1993 | Marchand et al. |
| 4,565,795 A | 1/1986 | Short et al. | 5,272,124 A | 12/1993 | Wu |
| 4,567,153 A | 1/1986 | Graves | 5,283,301 A | 2/1994 | McDaniel et al. |
| 4,575,538 A | 3/1986 | Hsieh et al. | 5,284,811 A | 2/1994 | Witt et al. |
| 4,588,703 A | 5/1986 | Cowan et al. | 5,286,823 A | 2/1994 | Rath |
| 4,596,862 A | 6/1986 | McDaniel et al. | 5,288,677 A | 2/1994 | Chung et al. |
| 4,604,438 A | 8/1986 | Beuhler et al. | 5,321,106 A | 6/1994 | LaPointe |
| 4,618,595 A | 10/1986 | Dietz | 5,322,910 A | 6/1994 | Wu |
| 4,618,661 A | 10/1986 | Kaus et al. | 5,324,881 A | 6/1994 | Kresge et al. |
| 4,619,980 A | 10/1986 | McDaniel et al. | 5,326,921 A | 7/1994 | Chen |
| 4,626,519 A | 12/1986 | Miro et al. | 5,326,923 A | 7/1994 | Cooper et al. |
| 4,677,174 A | 6/1987 | Alexander et al. | 5,328,881 A | 7/1994 | Jackson et al. |
| 4,680,351 A | 7/1987 | Miro et al. | 5,328,956 A | 7/1994 | Hasebe et al. |
| 4,681,866 A | 7/1987 | McDaniel et al. | 5,330,949 A | 7/1994 | Funabahsi et al. |
| 4,684,707 A | 8/1987 | Evans | 5,331,104 A | 7/1994 | Reagen et al. |
| 4,686,092 A | 8/1987 | Lok et al. | 5,332,708 A | 7/1994 | Knudsen et al. |
| 4,689,436 A | 8/1987 | Minokami et al. | 5,338,812 A | 8/1994 | Knudsen et al. |
| 4,699,962 A | 10/1987 | Hsieh et al. | 5,347,026 A | 9/1994 | Patsidis et al. |
| 4,711,866 A | 12/1987 | Kuntz | 5,350,723 A | 9/1994 | Neithamer et al. |
| 4,719,190 A | 1/1988 | Drago et al. | 5,350,726 A | 9/1994 | Shaffer |
| 4,719,271 A | 1/1988 | Dietz | 5,350,819 A | 9/1994 | Shaffer |
| 4,721,559 A | 1/1988 | Olah | 5,354,721 A | 10/1994 | Geerts |
| 4,732,936 A | 3/1988 | Holohan, Jr. | 5,362,825 A | 11/1994 | Hawley et al. |
| 4,744,970 A | 5/1988 | Lok et al. | 5,365,010 A | 11/1994 | Rao et al. |
| 4,757,044 A | 7/1988 | Cooper et al. | 5,366,945 A | 11/1994 | Kresge et al. |
| 4,780,513 A | 10/1988 | Powers et al. | 5,371,154 A | 12/1994 | Brandvold et al. |
| 4,788,171 A | 11/1988 | Klendworth | 5,382,420 A | 1/1995 | Vaughan |
| 4,791,086 A | 12/1988 | Yeh et al. | 5,384,299 A | 1/1995 | Turner et al. |
| 4,793,833 A | 12/1988 | Lok et al. | 5,393,911 A | 2/1995 | Patsidis et al. |
| 4,801,364 A | 1/1989 | Wilson et al. | 5,399,635 A | 3/1995 | Neithamer et al. |
| 4,814,308 A | 3/1989 | Konrad et al. | 5,399,636 A | 3/1995 | Alt et al. |
| 4,822,707 A | 4/1989 | Inoue et al. | 5,401,817 A | 3/1995 | Palackal et al. |
| 4,824,554 A | 4/1989 | Lok et al. | 5,403,803 A | 4/1995 | Shaffer et al. |
| 4,824,921 A | 4/1989 | Luvinh | 5,409,873 A | 4/1995 | Chung et al. |
| 4,843,133 A | 6/1989 | Short et al. | 5,412,024 A | 5/1995 | Okada et al. |
| 4,845,066 A | 7/1989 | Fahey et al. | 5,414,177 A | 5/1995 | Chung et al. |
| 4,846,956 A | 7/1989 | Lok et al. | 5,414,180 A | 5/1995 | Geerts et al. |
| 4,849,572 A | 7/1989 | Chen et al. | 5,414,187 A | 5/1995 | King et al. |
| 4,868,343 A | 9/1989 | King et al. | 5,418,303 A | 5/1995 | Shaffer |
| 4,879,425 A | 11/1989 | Kukes et al. | 5,426,080 A | 6/1995 | Kundsen et al. |
| 4,894,213 A | 1/1990 | Flanigen et al. | 5,436,305 A | 7/1995 | Alt et al. |
| 4,900,704 A | 2/1990 | McDaniel et al. | 5,444,132 A | 8/1995 | Witt et al. |
| 4,912,279 A | 3/1990 | Wilcher et al. | 5,446,102 A | 8/1995 | Oziomek et al. |
| 4,929,800 A | 5/1990 | Drago et al. | 5,453,410 A | 9/1995 | Kolthammer et al. |
| 4,935,576 A | 6/1990 | Chen | 5,459,218 A | 10/1995 | Palackal et al. |
| 4,948,768 A | 8/1990 | Kukes et al. | 5,461,127 A | 10/1995 | Naganuma et al. |
| 4,952,544 A | 8/1990 | McCauley | 5,466,766 A | 11/1995 | Patsidis et al. |
| 4,952,739 A | 8/1990 | Chen | 5,475,162 A | 12/1995 | Brandvold et al. |

| | | | |
|---|---|---|---|
| 5,491,214 A | | 2/1996 | Daughenbaugh et al. |
| 5,561,095 A | | 10/1996 | Chen et al. |
| 5,633,419 A | | 5/1997 | Spencer et al. |
| 5,648,580 A | | 7/1997 | Chen et al. |
| 5,663,470 A | * | 9/1997 | Chen et al. |
| 5,710,225 A | | 1/1998 | Johnson et al. |
| 5,789,335 A | * | 8/1998 | Chen et al. |

FOREIGN PATENT DOCUMENTS

| | | |
|---|---|---|
| EP | 0101205 | 2/1984 |
| EP | 0202965 | 11/1986 |
| EP | 0273627 | 7/1988 |
| EP | 0352856 A1 | 1/1990 |
| EP | 0352856 B1 | 1/1990 |
| EP | 0367385 | 5/1990 |
| EP | 0367386 | 5/1990 |
| EP | 0391697 | 10/1990 |
| EP | 0575866 | 12/1993 |
| SU | 859391 | 9/1981 |
| WO | 94/28037 | 12/1984 |
| WO | 91/14719 | 10/1991 |
| WO | 92/04115 | 3/1992 |
| WO | 93/02110 | 2/1993 |
| WO | 93/19103 | 9/1993 |
| WO | 94/13714 | 6/1994 |
| WO | 94/28036 | 12/1994 |
| WO | 96/05236 | 2/1996 |

OTHER PUBLICATIONS

Patent Abstracts of Japan, vol. 96, No. 5, May 31, 1996.

Patent Abstracts of Japan, vol. 6, No. 191 (C–127), Sep. 30, 1982.

An International Search Report and Annex of PCT/US98/00009, dated May 22, 1998.

A Partial International Report and Annex of PCT/US 98/00012.

An International Search Report and Annex of PCT/US98/00010, dated May 14, 1998.

An International Search Report and Annex of PCT/US98/00011, dated May 22, 1998.

Bittles et al., "Clay–Catalyzed Reactions of Olefins. I. Polymerization of Styrene", *Journal of Polymer Science: Part A*, vol. 2, pp. 1221–1231 (1964).

Bittles et al., "Clay–Catalyzed Reactions of Olefins. II. Catalyst Acidity and Mechanism", *Journal of Polymer Science: Part A*, vol. 2, pp. 1847–1862 (1964).

Salt, "The Use of Activated Clays as Catalysts in Polymerization Processes, with Particular Reference to Polymers of Alpha Methyl Styrene", *Clay Minerals Bulletin*, vol. 2, pp. 55–58 (1948).

Peng et al., "Electrophilic Polymerization of 1,3–Pentadiene Initiated by Aluminum Triflate", *Eur. Polym. J.*, vol. 30, No. 1, pp. 69–77 (1994).

Gandini et al., "The Heterogeneous Cationic Polymerization of Aromatic Monomers by Aluminum Triflate", *Polymer Preprints*, American Chemical Society, pp. 359–360 (1996).

Okuhara et al., "Catalytic Chemistry of Heteropoly Compounds", *Advances in Catalysis*, vol. 41, pp. 113–252 (1996).

Misono et al., "Solid Superacid Catalysts", *Chemtech*, pp. 23–29 (Nov. 1993).

Deno et al., "Acid Catalysts in $O_2$ Oxidations and the Possible Role of the Hydroperoxy Cation, $HO_2^+$", *Journal of the American Chemical Society*, 91:19, pp. 5237–5238 (Sep. 10, 1969).

Stevens, "Insite™ Catalysts Structure/Activity Relationships for Olefin Polymerization", *Stud. Surf. Sci. Catal.*, vol. 89, pp. 277–284 (1994).

Habimana et al., "Synthesis of Polymers Containing Pseudohalid Groups by Cationic Polymerization. 5. Study of Various Aspects of the 2–Methylpropene Polymerization Coinitiated by Hydrazoic Acid", *Macromolecules*, vol. 26, No. 9, pp. 2297–2302 (1993).

Cheradame et al., "Synthesis of Polymers Containing Pseudohalid Groups by Cationic Polymerization, $7^{a)}$, Thiocyanato–and Isothiocyanato–functionalized Poly(2–methylpropene)", *Makromol. Chem., Rapid Commun.*, 13, pp. 433–439 (1992).

Cheradame et al., "Synthesis of Polymers Containing Pseudohalide Groups by Cationic Polymerization, $4^{a)}$, Cocatalysis as a Direct Route to End–capped Poly(2–methylpropene) with Pseudohalide Groups", *Makromol. Chem.*, 193, pp. 2647–2658 (1992).

Cheradame et al., "Synthesis of Polymers Containing Pseudohalide Groups by Cationic Polymerization, $3^{a)}$, Preliminary Study of the Polymerization and Copolymerization of Alkenyl Monomers Azide Groups", *Makromol Chem.*, pp. 2777–2789 (1991).

Hlatky et al., "Ionic, Base–Free Zirconocene Catalysts for Ethylene Polymerization", *J. Am. Chem. Soc.*, 111, pp. 2728–2729 (1989), accompanied by 48 pages of Supplementary Material.

Hlatky et al., "Metallacarboranes as Labile Anions for Ionic Zirconocene Olefin Polymerization Catalysts", *Organometallics*, 11, pp. 1413–1416 (1992), accompanied by 7 pages of Supplementary Material.

Cheradame et al., "Heterogeneous Cationic Polymerization Initiators I: Polymerization of 2–methylpropene in a Non Polar Medium", *C.R. Acad. Sci. Paris*, t. 318, Série II, pp. 329–334 (1994), including an English language abstract.

Schmid et al., "Unbridged Cyclopentadienyl–Fluorenyl Complexes of Zirconium as Catalysts for Homogeneous Olefin Polymerization", *Journal of Organometallic Chemistry*, 501, pp. 101–06 (1995).

Alt et al., "Verbrückte Bis(fluorenyl)komplexe des Zirconiums und Hafniums als hochreaktive Katalysatoren bei der homogenen Olefinpolymerisation. Die Molekülstrukturen von $(C_{13}H_9-C_2H_4-C_{13}H_9)$ und $(\eta^5:\eta^5-C_{13}H_8-C_2H_4-C_{13}H_8)ZrCl_2$", *Journal of Organometallic Chemistry*, 472, pp. 113–118 (1994).

Smith et al., "Bimetallic Halides. Crystal Structure of and Ethylene Polymerization by $VCl_2 \cdot ZnCl_2 \cdot 4THF$", *Inorganic Chemistry*, vol. 24, No. 19, pp. 2997–3002 (1985), accompanied by pages of Supplementary Material.

Martin, "Titanium and Rare Earth Chloride Catalysts for Ethylene Polymerization", *Journal of Polymer Science: Polymer Chemistry Edition*, vol. 22, pp. 3843–3850 (1984).

Freeman et al., "Ethylene Polymerization Over Organochromium Catalysts: A Comparison Between Closed and Open Pentadienyl Ligands", *Journal of Polymer Chemistry: Part A: Polymer Chemistry*, vol. 25, pp. 2063–2075 (1987).

Clark et al., "Heats of Polymerization of 1–Butene over Silica–Alumina", *Journal of Catalysis*, 21, pp. 179–185 (1971).

McDaniel, "Controlling Polymer Properties with the Phillips Chromium Catalysts", *Ind. Eng. Chem. Res.*, pp. 1559–1564 (1988).

Patsidis et al., "The Preparation and Characterization of 9–Substituted Bis(fluorenyl) Zirconium Dichloride Complexes", *Journal of Organometallic Chemistry*, 501, pp. 31–35 (1995).

Alt et al., "Formation and Reactivity of the Ethylene Complex $Cp_2TiC_2H_4$, The Crystal Structure of$(Cp_2TiEt)O$", *Journal of Organometallic Chemistry*, 349, pp. C7–C10 (1988).

Smith et al., "Synthesis of Copolymers of m–Diisopropylbenzene and m–Dimethoxybenzene", *Polymer Sci Technol.* (Plenum), 25, pp. 415–429 (1984).

Kennedy et al., "New Telechile Polymers and Sequential Copolymers by Polyfunctional Initiator–Transfer Agents (Inifers I. Synthesis and Characterization of $\alpha$, $\omega$–Di(t–chloro)polyisobutylene", *Polym. Prepr.*, 20(2), pp. 316–319 (1979).

Izumi, "Silica–Included Heteropoly Compounds as Insoluble, Readily Separable Solid Acid Catalysts", Slides Presented at the 1995 International Chemical Congress of Pacific Basin Societies in Honolulu, Hawaii (Dec. 17–22, 1995).

Cai et al., "Study on the Oligomerization of Isobutene Using Heteropoly Acids and Their Salts as Catalysts", *Cuihua Xuebao*, pp. 370, 371, and 375 (1985).

Corma, "Inorganic Solid Acids and Their Use in Acid–Catalysts Hydrocarbon Reactions", *Chem. Rev.*, 95, pp. 559–614 (1995).

Okuhara et al., "High–Pressure Oligomerization of Propene over Heteropoly Acids", *Journal of Catalysis*, 147, pp. 441–454 (1994).

Okuhara et al., "Alkylation of Isobutene with Butenes Catalyzed by a Cesium Hydrogen Salt of 12–Tungstophosphoric Acid", *Chemistry Letters*, pp. 1451–1454 (1994).

Kamada et al., "Dispersion and Fixation of 12–Tungstophosphate Anion on a Silica Surface Modified with Silane Agents Having an Amine Group and Their Catalytic Properties", *Bull. Chem. Soc. Jpn.*, 66, pp. 3565–3570 (1993).

Na et al., "Skeletal Isomerization of n–Butane Catalyzed by an Acidic Cesium Salt of 12–Tungstophosphoric Acid", *Chemistry Letters*, pp. 1141–1144 (1993).

Izumi et al., "Acidic Cesium Salts of Keggin–type Heteropolytungstic Acids as Insoluble Solid Acid Catalysts for Esterification and Hydrolysis Reactions", *Chemistry Letters*, pp. 825–828 (1993).

Hu et al., "Catalysis by Heteropoly Compounds XXII. Reactions of Esters and Esterification Catalyzed by Heteropolyacids in a Homogeneous Liquid Phase–Effects of the Central Atom of Heteropolyanions Having Tungsten as the Addenda Atom", *Journal of Catalysis*, 143, pp. 437–448 (1993).

Lee et al., "Catalysis by Heteropoly Compounds. 20. An NMR Study of Ethanol Dehydration in the Pseudoliquid Phase of 12–Tungstophosphoric Acid", *J. Am. Chem. Soc.*, 114, pp. 2836–2842 (1992).

Izumi et al., "Acidic Alkai Metal Salts and Ammonium Salts of Keggin–type Heteropolyacids ad Efficient Solid Acid Catalysts for Liquid–phase Friedel–Crafts Reactions", *Chemistry Letters*, pp. 1987–1990 (1992).

Kozhevnikov et al., "De–t–Butylation of Phenols Catalyzed by Bulk and Supported Heteropoly Acid", *Journal of Molecular Catalysis*, 75, pp. 179–186 (1992).

Nishimura et al., "High Catalytic Activities of Pseudoliquid Phase of Dodecatungstophosphoric Acid for Reactions of Polar Molecules", *Chemistry Letters*, pp. 1695–1698 (1991).

Lee et al., "NMR Evidence for Ethyl Cation and Protonated Ethanol in the Pseudoliquid Phase of $H_3PW_{12}O_{40}$", *Chemistry Letters*, pp. 1175–1178 (1988).

Baba et al., "Heteropolyacids and their Salts Supported on Acidic Ion–Exchange Resin as Highly Active Solid–Acid Catalysts", *Applied Catalysis*, 22, pp. 321–324 (1986).

Hibi et al., "Catalysis by Heteropoly Compounds X. Synthesis of Lower Olefins by Conversion of Dimethyl Ether Over 12–Tungstophosphates", *Applied Catalysis*, 24, pp. 69–83 (1986).

Tatematsu et al., "Preparation Process and Catalytic Activity of $Cs_xH_{3-x}PW_{12}O_{40}$", *Chemistry Letters*, pp. 865–868 (1984).

Hayashi et al., "Methanol Conversion over Metal Salts of 12–Tungstophosphoric Acid", *Journal of Catalysis*, 81, pp. 61–66 (1983).

Izumi et al., "Catalysis by Heterogeneous Supported Heteropoly Acid", *Journal of Catalysis*, 84, pp. 402–409 (1983).

Izumi et al., "Efficient Homogeneous Acid Catalysis of Heteropoly Acid and its Characterization Through Ether Cleavage Reactions", *Journal of Molecular Catalysis*, 18, pp. 299–314 (1983).

Okuhara et al., "Catalysis by Heteropoly Compounds. VI. The Role of the Bulk Acid Sites in Catalytic Reactions over $Na_xH_{3-x}PW_{12}O_{40}$", *Journal of Catalysis*, 83, pp. 121–130 (1983).

Baba et al., "The Conversion of Methanol into Hydrocarbons over Metal Salts of Heteropolyacids", *Bull. Chem. Soc. Jpn.*, 55, pp. 2657–2658 (1982).

Sebulsky et al., "Alkylation of Benzene with Dodecene–1 Catalyzed by Supported Silicotungstic Acid", *Ind. Eng. Chem. Process Des. Develop.*, vol. 10, No. 2, pp. 272–279 (1971).

Pillai et al., "Oligomerization of Vinylic Compounds on Montmorillonite Clay Catalysts", *React. Kinet. Catal. Lett.*, vol. 55, No. 2, pp. 251–257 (1995).

Okuhara et al., "Insoluble Heteropoly Compounds as Highly Active Catalysts for Liquid–phase Reactions", *J. Mol. Cat.*, 75, pp. 247–256 (1992).

Mizuno et al., "Heteropolyanions in Catalysis", *Journal of Molecular Catalysis*, 86, pp. 319–342 (1994).

Izumi et al., "Heteropoly Acid Catalysis—a Unique Blend of Acid–Base and Redox Properties", *Properties in Catalysis*, pp. 431–464 (1992).

Misono, "Heterogeneous Catalysis by Heteropoly Compounds of Molybdenum and Tungsten", *Catal. Rev.–Sci. Eng.*, 29(2&3), pp. 269–321 (1987).

Fu et al., "Perflurooctanesulfonic Acid Catalyzed Friedel––Crafts Alkylation with Alkyl Halides", *Synthetic Communications*, 21(10&11), pp. 1273–1279 (1991).

Waller et al., "Catalysis with Nafion", *Chemtech*, 17, pp. 438–441 (Jul. 1987).

Harmer et al., "Unique Silane Modified Perfluorosulfonic Acids as Versatile Reagents for New Solid Acid Catalysts", *Chem. Commun.*, pp. 1803–1804 (1997).

Harmer et al., "High Surface Area Nafion Resin/Silica Nanocomposites: A New Class of Solid Acid Catalyst", *J. Am. Chem. Soc.*, vol. 118, No. 33, pp. 7708–7715 (1996).

Kawada et al., "Lanthanide Trifluoromethanesulfonates as Reusable Catalysts: Catalytic Friedel–Crafts Acylation", *J. Chem. Soc. Chem. Commun.*, pp. 1157–1158 (1993).

Kobayashi et al., "The Aldol Reaction of Silyl Enol Ethers with Aldehydes in Aqueous Media", *Tetrahedron Letters*, vol. 33, No. 12, pp. 1625–1628 (1992).

Thomas et al., "Chemistry of Weakly Solvated Lanthanide-Metal Cations. Synthesis, Characterization, and Catalytic Chemistry of [Eu(CH$_3$CN)$_3$(BF$_4$)$_3$]$_x$.", *J. Am. Chem. Soc.*, 108, 4096–4103 (1986).

Holohan et al., "Hydrocarbon Resins", reprinted from *Kirk–Othmer: Encyclopedia of Chemical Technology*, vol. 12, pp. 852–869 (1980).

Chemical Abstract No. 84:73847a (1976).

Olah et al., "Boron, Aluminum, and Gallium Tris(trifluoromethanesulfonate) (Triflate): Effective New FriedelCrafts Catalysts", *J. Am. Chem. Soc.*, 110, pp. 2560–2565 (1988).

Collomb et al., "Cationic Polymerisation and Electrophilic Reactions by Metal Salts of Strong Acids", *Cationic Polymerization and Related Processes*, pp. 49–67 (1984).

Collomb et al., "Cationic Polymerization Induced by Metal Salts—I", *European Polymer Journal*, vol. 16, pp. 1135–1144 (1980).

Collomb et al., "Cationic Polymerisation Induced by Metal Salts of Strong Acids: Kinetics and Mechanisms", *Proc. IUPAC, I.U.P.A.C., Macromol. Symp., 28th*, p. 136 (1982).

Lowery, "Hydrocarbon Resins", *Kirk–Othmer: Encyclopedia of Chemical Technology*, vol. 13, pp. 717–743 (1995).

Cai et al., "Study of the Oligomerization of Isobutene Using Heteropoly Acids and Their Salts as Catalysts", *Cuihua Xuebao (Journal of Catalysis)*, pp. 370–375 (1985).

\* cited by examiner

METAL HALIDE SOLID ACIDS AND SUPPORTED METAL HALIDES AS CATALYSTS FOR THE PREPARATION OF HYDROCARBON RESINS

CROSS-REFERENCE OF RELATED APPLICATIONS

The present application claims the priority under 35 U.S.C. §119(e) of U.S. Provisional Application No. 60/035,217, filed Jan. 8, 1997; U.S. Provisional Application No. 60/034,579, filed on Jan. 9, 1997; and U.S. Provisional Application No. 60/035,797, filed on Jan. 10, 1997; the disclosures of which are herein expressly incorporated by reference in their entirety. The present application expressly incorporates by reference the entire disclosures of U.S. application Ser. No. 09/003,596, entitled "Solid Acids as Catalysts for the Preparation of Hydrocarbon Resins"; U.S. application Ser. No. 09/003,888, entitled "Metal Oxide Solid Acids as Catalysts for the Preparation of Hydrocarbon Resins"; and U.S. application Ser. No. 09/003,594, entitled "Fluorinated Solid Acids as Catalysts for the Preparation of Hydrocarbon Resins"; all of which are concurrently filed with the present application.

BACKGROUND OF THE INVENTION

1. Field of the Invention

This invention relates to supported metal halides and metal halide solid acids useful as catalysts for the polymerization of a feed stream containing at least one of pure monomer, C5 monomers, and C9 monomers to produce a hydrocarbon resin, to processes of preparing hydrocarbon resins using at least one of supported metal halides and metal halide solid acid catalysts, and to hydrocarbon resins produced by such processes.

2. Discussion of Background

Hydrocarbon resins are low molecular weight, thermoplastic materials prepared via thermal or catalytic polymerization. The resins may be derived from several different sources of monomers. The monomer sources include cracked petroleum distillate from oil refining, turpentine fractions (e.g., terpenes from natural product distillation), paper mill by-product streams, coal tar, and a variety of pure olefinic monomers.

The resulting hydrocarbon resins can range from viscous liquids to hard, brittle solids with colors ranging from water white to pale yellow, amber, or dark brown depending on the monomers used and the specific reaction conditions. Typically, pure monomer resins tend to be water white, C9 monomer resins tend to be brown, and C5 monomer resins tend to be yellow.

Hydrocarbon resins are used extensively as modifiers in adhesives, rubber, hot-melt coatings, printing inks, paint, flooring, and other applications. The resins are usually used to modify other materials.

Pure monomer hydrocarbon resins can be prepared by cationic polymerization of styrene-based monomers such as styrene, alpha-methyl styrene, vinyl toluene, and other alkyl substituted styrenes using Friedel-Crafts polymerization catalysts such as unsupported Lewis acids (e.g., boron trifluoride ($BF_3$), complexes of boron trifluoride, aluminum trichloride ($AlCl_3$), alkyl aluminum chlorides).

Similarly, aliphatic C5 hydrocarbon resins can be prepared by cationic polymerization of a cracked petroleum feed containing C5 and C6 paraffins, olefins, and diolefins also referred to as "C5 monomers". These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. The polymerizations are catalyzed using Friedel-Crafts polymerization catalysts such as unsupported Lewis acids (e.g., boron trifluoride ($BF_3$), complexes of boron trifluoride, aluminum trichloride ($AlCl_3$), or alkyl aluminum chlorides). In addition to the reactive components, nonpolymerizable components in the feed include saturated hydrocarbons which can be codistilled with the unsaturated components such as pentane, cyclopentane, or 2-methylpentane. This monomer feed can be copolymerized with C4 or C5 olefins or dimers as chain transfer agents.

Also, aromatic C9 hydrocarbon resins can be prepared by cationic polymerization of aromatic C8, C9, and/or C10 unsaturated monomers derived from petroleum distillates resulting from naphtha cracking and are referred to as "C9 monomers". These monomer streams are comprised of cationically polymerizable monomers such as styrene, alpha-methyl styrene, beta-methyl styrene, vinyl toluene, indene, dicyclopentadiene, divinylbenzene, and other alkyl substituted derivatives of these components. The polymerizations are catalyzed using Friedel-Crafts polymerization catalysts such as unsupported Lewis acids (e.g., boron trifluoride ($BF_3$), complexes of boron trifluoride, aluminum trichloride ($AlCl_3$), alkyl aluminum chlorides). In addition to the reactive components, nonpolymerizable components include aromatic hydrocarbons such as xylene, ethyl benzene, cumene, ethyl toluene, indane, methylindane, naphthalene and other similar species. These nonpolymerizable components of the feed stream can be incorporated into the resins via alkylation reactions.

Although unsupported Lewis acids are effective catalysts for the cationic polymerization reactions to produce hydrocarbon resins, they have several disadvantages. Conventional unsupported Lewis acids are single use catalysts which require processing steps to quench the reactions and neutralize the acids.

Further, conventional unsupported Lewis acids also require removal of catalyst salt residues from the resulting resin products. Once the salt residues generated from the catalyst neutralization are removed, the disposal of these residues presents an additional cost. Therefore, it is of particular interest to reduce the amount of catalyst residues, particularly halogen-containing species generated in these reactions.

Another problem involved in using conventional unsupported Lewis acid catalysts, such as $AlCl_3$ and $BF_3$, is that they are hazardous materials. These conventional Lewis acid catalysts generate highly corrosive acid gases on exposure to moisture, (e.g., HF, HCl).

In addition to the traditional Lewis acids, work has been done with certain solid acid catalysts. BITTLES et al., "Clay-Catalyzed Reactions of Olefins. I. Polymerization of Styrene", *Journal of Polymer Science: Part A,* Vol. 2, pp. 1221–31 (1964) and BITTLES et al., "Clay-Catalyzed Reactions of Olefins. II. Catalyst Acidity and Measurement", *Journal of Polymer Science: Part A,* Vol. 2, pp. 1847–62 (1964), the disclosures of which are herein incorporated by reference in their entireties, together disclose polymerization of styrene with acid clay catalysts to obtain polymers having molecular weights between 440 and 2000 as determined by freezing point depression of benzene solutions. These documents disclose that the catalyst was prepared for polymerization by heating under vacuum, and that if the catalyst adsorbed moisture, the activity of the catalyst could be restored by reheating under vacuum.

SALT, "The Use of Activated Clays as Catalysts in Polymerisation Processes, with Particular Reference to Polymers of Alpha Methyl Styrene", *Clay Minerals Bulletin*, Vol. 2, pp. 55–58 (1948), the disclosure of which is herein incorporated by reference in its entirety, discloses polymerization of styrene and/or alpha-methyl styrene by using a clay catalyst to obtain polymers that range from dimers to molecular weights of about 3000.

U.S. Pat. No. 5,561,095 to CHEN et al., the disclosure of which is herein incorporated by reference in its entirety, discloses a supported Lewis acid catalyst for polymerization of olefins, including C3–C23 alpha-olefins, to obtain polymers having number average molecular weights (Mn) ranging from about 300 to 300,000. Exemplary Lewis acid supports include silica, silica-alumina, zeolites, and clays. Example 1 of CHEN et al. discloses that a Lewis acid supported on silica is heated under vacuum.

U.S. Pat. No. 3,799,913 to WHEELER et al., the disclosure of which is herein incorporated by reference in its entirety, discloses Friedel-Crafts catalysts for polymerization of polymerizable constituents, including alpha-methyl styrene, indene, vinyl toluene and styrene, to obtain polymers having a number average molecular weight (Mn) ranging from about 350 to 1200. Zinc chloride is disclosed as one of the Friedel-Crafts catalysts.

U.S. Pat. No. 3,652,707 to SAINES, the disclosure of which is herein incorporated by reference in its entirety, discloses Friedel-Crafts metal halide catalysts for polymerization of olefin hydrocarbons, including pentene, styrene and methylstyrene, to obtain polymers having a molecular weight of from about 700 to about 2500. Zinc chloride is disclosed as one of the Friedel-Crafts metal halide catalysts.

PENG et al., "Electrophilic Polymerization of 1,3-Pentadiene Initiated by Aluminum Triflate", *Eur. Polym. J*, Vol. 30, No. 1, pp. 69–77 (1994), the disclosure of which is herein incorporated by reference in its entirety, discloses aluminum triflate for polymerization of piperylene to obtain polymers having varying number average molecular weights.

European Patent Application 0 352 856 A1, the disclosure of which is herein incorporated by reference in its entirety, discloses use of aluminum triflate, cerium triflate, e.g., for oligomerization of C3 to C6 olefins to obtain oligomers having 6 to 24 carbon atoms.

GANDINI et al., "The Heterogeneous Cationic Polymerization of Aromatic Monomers by Aluminum Triflate", *Polymer Preprints*, American Chemical Society, pp. 359–360 (1996), the disclosure of which is herein incorporated by reference in its entirety, discloses use of aluminum triflate for polymerization of C9 related monomers to obtain a polymer having a number average molecular weight (Mn) around 3000. This document also discloses that aluminum triflate could be useful for the direct "resinification" of mixtures of aromatic monomers and solvents arising from specific petroleum cuts.

Other documents, the disclosures of which are herein incorporated by reference in their entireties, which generally disclose the use of solid acid catalysts to polymerize monomers for the preparation of resins include U.S. Pat. No. 4,068,062 to LEPERT, U.S. Pat. No. 4,130,701 to LEPERT, U.S. Pat. No. 4,245,075 to LEPERT, and U.S. Pat. No. 4,824,921 to LUVINH.

SUMMARY OF THE INVENTION

The present invention involves the preparation of hydrocarbon resins. More particularly, the present invention involves the use of at least one of supported metal halides and metal halide solid acid catalysts to polymerize a feed of hydrocarbon monomers.

Hydrocarbon resins are prepared from at least one of pure monomer, C5 monomers, and C9 monomers using relatively environmentally benign, recyclable, at least one of supported metal halides and metal halide solid acid catalysts in which freely-associated water may have been removed. In the present invention, hydrocarbon resins are prepared by a cationic polymerization (e.g., Friedel-Crafts) wherein a feed stream containing at least one of pure monomer, C5 monomers, and C9 monomers is preferably treated with at least one of supported metal halides and metal halide solid acid catalyst.

Before use, the solid acid catalysts and/or supports may be treated to remove freely-associated water associated with the solids to maximize catalyst acidity and activity toward the polymerization. For example, prior to use, the catalyst and/or support may be calcined for a sufficient time to remove freely-associated water and/or the catalyst and/or support can be exposed to reduced atmospheric pressure. For instance, the calcining may be at a temperature up to about 700° C., preferably at a temperature between about 50° C. and 500° C. The calcining may be under reduced atmospheric pressure for up to about 8 hours, preferably between about 1 hour to 4 hours.

In accordance with one aspect, the present invention is directed to a process for making a hydrocarbon resin, including polymerizing a feed stream comprising at least one member selected from the group consisting of pure monomer, C5 monomers, and C9 monomers in the presence of a supported metal halide solid acid catalyst to produce a hydrocarbon resin, wherein substantially all freely-associated water has been removed from the supported metal halide solid acid catalyst.

In accordance with another aspect, the present invention is directed to a process for making a hydrocarbon resin, including polymerizing a feed stream comprising at least one member selected from the group consisting of pure monomer, C5 monomers, and C9 monomers in the presence of $ZrCl_4$ to produce a hydrocarbon resin.

The supported metal halide solid acid catalyst may comprise Lewis acid on clay, silica, silica-alumina, mesoporous silica, mesoporous silica-alumina, ion exchange resin, zeolite. The Lewis acid may include at least one member selected from the group consisting of $ZnCl_2$, $AlCl_3$, $AlBr_3$, $BF_3$, $BCl_3$, $FeCl_3$, $SnCl_4$, $TiCl_4$, $ZrCl_4$, $HfCl_4$, $BiCl_3$, and lanthanide halides.

The clay supports may include naturally occurring clay mineral such as at least one member selected from the group consisting of kaolinite, bentonite, attapulgite, montmorillonite, clarit, Fuller's earth, hectorite, and beidellite; synthetic clay such as at least one member selected from the group consisting of saponite and hydrotalcite; montmorillonite clay treated with at least one member selected from the group consisting of sulfuric acid and hydrochloric acid; and modified clay including at least one member selected from the group consisting of aluminum oxide pillared clay, cerium modified alumina pillared clay, and metal oxide pillared clay.

The zeolite support may include at least one member selected from the group consisting of zeolite Y, zeolite β, MFI, MEL, NaX, NaY, faujasite, and mordenite.

In another feature of the present invention, the supported metal halide solid acid catalyst includes polymer grafted aluminum halide.

In accordance with another feature of the invention, the feed stream includes between about 20 wt % and 80 wt % monomers and about 80 wt % to 20 wt % of solvent. Preferably, the feed stream includes about 30 wt % to 70 wt % monomers and about 70 wt % to 30 wt % of solvent. More preferably, the feed stream includes about 50 wt % to 70 wt % monomers and about 50 wt % to 30 wt % of solvent. The solvent may include an aromatic solvent. The aromatic solvent may include at least one member selected from the group consisting of toluene, xylenes, and aromatic petroleum solvents. The solvent may include an aliphatic solvent. The invention may further include recycling the solvent.

In accordance with a feature of the invention, the feed stream includes at least C5 monomers. The feed stream may include at least C5 monomers, wherein cyclopentadiene and methylcyclopentadiene components are removed from the feed stream by heating at a temperature between about 100° C. and 160° C. and fractionating by distillation. The C5 monomers may include at least one member selected from the group consisting of 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene. The feed stream may include at least C5 monomers, wherein the feed stream includes at least about 70 wt % of polymerizable monomers with at least about 50 wt % 1,3-pentadiene. The C5 feed stream may contain low levels of isoprene, generally contains a portion of 2-methyl-2-butene, and may contain one or more cyclodiolefins. The C5 monomers feed stream may further comprise isobutylene.

The feed stream may include at least C5 monomers, wherein the feed stream further includes up to about 40 wt % of chain transfer agent, preferably up to about 20 wt % of chain transfer agent. The chain transfer agent may include at least one member selected from the group consisting of C4 olefins, C5 olefins, dimers of C4 olefins, and dimers of C5 olefins. The chain transfer agent may include at least one member selected from the group consisting of isobutylene, 2-methyl-1-butene, 2-methyl-2-butene, dimers thereof, and oligomers thereof.

In accordance with a feature of the invention, the feed stream includes about 30 wt % to 95 wt % of C5 monomers and about 70 wt % to 5 wt % of a cofeed including at least one member selected from the group consisting of pure monomer, C9 monomers, and terpenes. Preferably, the feed stream includes about 50 wt % to 85 wt % of C5 monomers and about 50 wt % to 15 wt % of a cofeed including at least one member selected from the group consisting of pure monomer, C9 monomers, and terpenes.

In accordance with another feature of the invention, the feed stream includes at least C9 monomers. The C9 monomers may include at least one member selected from the group consisting of styrene, vinyl toluene, indene, dicyclopentadiene, and alkylated derivatives thereof. The C9 monomers may include at least about 20 wt % polymerizable unsaturated hydrocarbons. The C9 monomers may include about 30 wt % to 75 wt % polymerizable unsaturated hydrocarbons. The C9 monomers may include about 35 wt % to 70 wt % polymerizable unsaturated hydrocarbons.

In accordance with a feature of the invention, the feed stream includes about 30 wt % to 95 wt % of the C9 monomers and about 70 wt % to 5 wt % of a cofeed including at least one member selected from the group consisting of pure monomer, C5 monomers, and terpenes. Preferably, the feed stream includes about 50 wt % to 85 wt % of the C9 monomers and about 50 wt % to 15 wt % of a cofeed including at least one member selected from the group consisting of pure monomer, C5 monomers, and terpenes.

Many of the supported metal halides and metal halide solid acid catalysts function most effectively in the presence of a controlled amount of water in the monomer feed stream. In accordance with this feature of the invention, the feed stream should include less than about 500 ppm water, preferably less than about 200 ppm water, more preferably less than about 100 ppm water, and most preferably less than about 50 ppm water.

In accordance with yet another feature of the invention, the feed stream is contacted with about 0.5 wt % to 30 wt %, preferably about 1 wt % to 20 wt %, more preferably about 3 wt % to 15 wt %, and most preferably 0.5 wt % to 5 wt % of the catalyst based on monomer weight in a batch reactor.

In accordance with yet another feature of the invention, the catalyst is added to the feed stream.

In accordance with another feature of the invention, the feed stream is added to a slurry of the catalyst in solvent. The feed stream may be passed over a fixed bed of the catalyst.

In accordance with yet another feature of the invention, the feed stream is cofed with a slurry of the catalyst into a reactor.

In accordance with a feature of the invention, the polymerization is carried out as a continuous process or as a batch process. A reaction time in the batch process is about 30 minutes to 8 hours, preferably about 1 hour to 4 hours at reaction temperature.

In accordance with a feature of the invention, the feed stream is polymerized at a reaction temperature between about −50° C. and 150° C., preferably between about −20° C. and 100° C., and more preferably between about 0° C. and 70° C.

In accordance with another feature of the invention, the polymerization is stopped by removing the catalyst from the hydrocarbon resin. The catalyst may be removed from the hydrocarbon resin by filtration. The hydrocarbon resin may be removed from a fixed bed reactor which includes the catalyst.

In accordance with a feature of the invention, the hydrocarbon resin is stripped to remove unreacted monomers, solvents, and low molecular weight oligomers. The unreacted monomers, solvents, and low molecular weight oligomers may be recycled.

In accordance with a feature of the invention, the hydrocarbon resin is separated from a hydrocarbon resin solution.

In accordance with a feature of the invention, the hydrocarbon resin has a softening point as measured by ASTM-E28 "Standard Test Method for Softening Point by Ring and Ball Apparatus", between about 5° C. and 170° C. The feed stream may include at least C5 monomers, wherein the softening point of the resulting hydrocarbon resin is between about 50° C. and 150° C. The feed stream may include at least C9 monomers, wherein the softening point of the resulting hydrocarbon resin is between about 70° C. and 160° C.

In accordance with a feature of the invention, the feed stream includes at least pure monomer, wherein the resulting hydrocarbon resin has a number average molecular weight (Mn) ranging from about 400 to 2000, a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC).

In accordance with a feature of the invention, the feed stream includes at least C5 monomers, wherein the resulting hydrocarbon resin has a number average molecular weight (Mn) of about 400 to 2000, a weight average molecular weight (Mw) of about 500 to 3500, a Z average molecular weight (Mz) of about 700 to 15,000, and a polydispersity (PD) as measured by Mw/Mn between about 1.2 and 5, where Mn, Mw, and Mz are determined by size exclusion chromatography (SEC).

In accordance with another feature of the invention, the feed stream includes at least C9 monomers, wherein the resulting hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, preferably 1.2 and 2.5, where Mn, Mw, and Mz are determined by size exclusion chromatography (SEC).

In accordance with another feature of the invention, the hydrocarbon resin is hydrogenated.

BRIEF DESCRIPTION OF THE DRAWINGS

The present invention is further described in the detailed description which follows, in reference to the noted plurality of non-limiting drawings, and wherein.

DETAILED DESCRIPTION OF THE INVENTION

Figure 1:
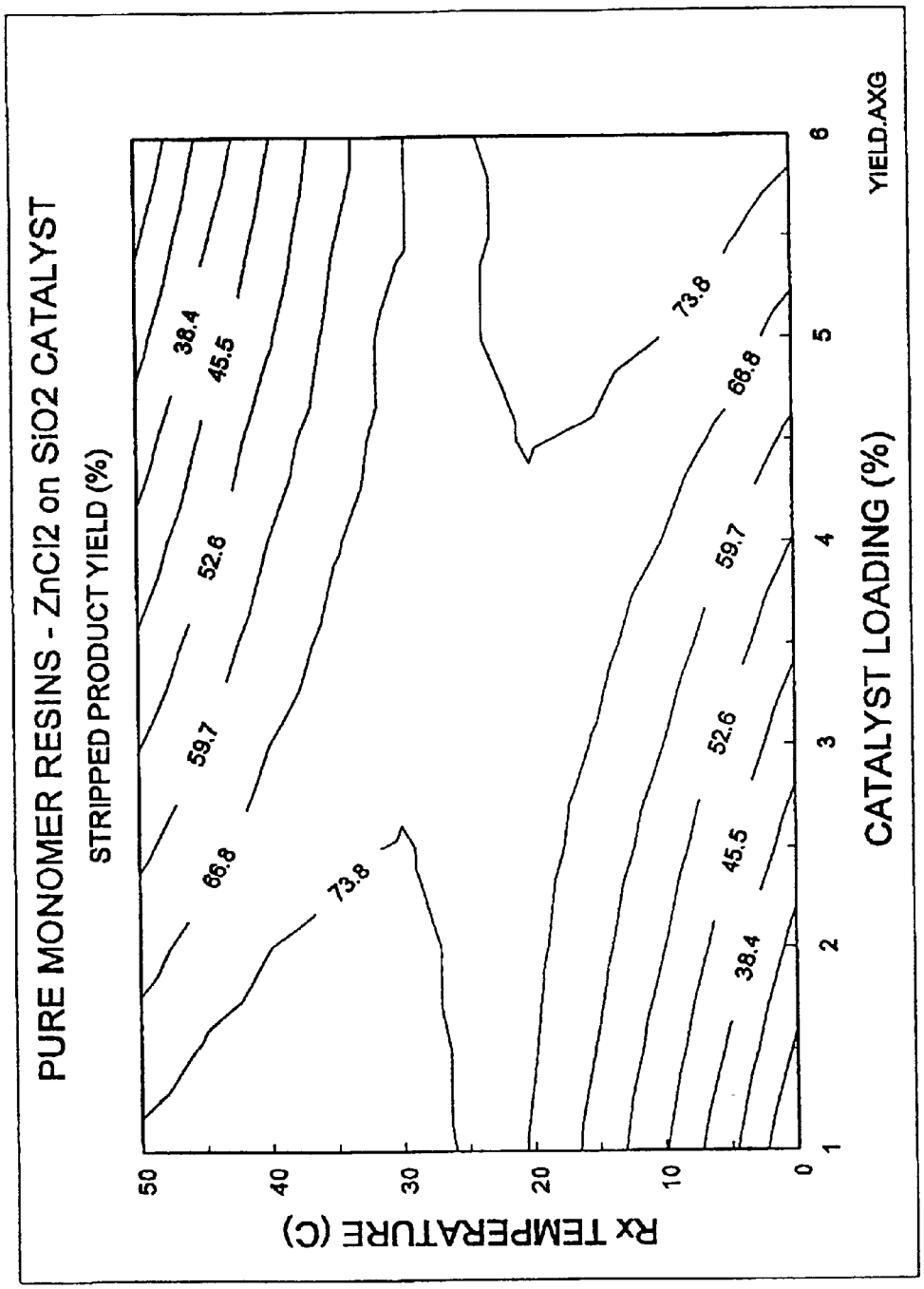
FIGS. 1–4 depict contour plots generated from regression analysis of various pure monomer resin polymerizations.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component includes the compound or component by itself, as well as in combination with other compounds and components, such as mixtures of compounds.

Before further discussion, a definition of the following terms will aid in the understanding of the present invention.

SOLID ACID: a solid which changes the color of a basic Hammett indicator with a $pK_a < 0$.

METAL HALIDE SOLID ACID: a solid acid comprising metal covalently bonded to halide.

SUPPORTED METAL HALIDE SOLID ACID: a solid catalyst comprising a support, e.g., silica, silica-alumina, clay, zeolite, associated with a compound comprising metal covalently bonded to halide.

HYDROCARBON RESIN: a low molecular weight (i.e., a number average molecular weight of about 200 to less than about 3000 as determined by size exclusion chromatography (SEC)) thermoplastic polymer synthesized via thermal or catalytic polymerization of cracked petroleum distillates, terpenes, coal tar fractions, or pure olefinic monomers, wherein one of the monomers is at least a C5 or higher.

PURE MONOMER: a composition comprising synthetically generated or highly purified monomer species, e.g., styrene from ethyl benzene or alpha methyl styrene from cumene.

PURE MONOMER FEED STREAM: a composition comprising any number of pure monomer species.

C5 MONOMERS: a composition derived from petroleum processing, e.g., cracking, containing unsaturated hydrocarbons comprising C5 and/or C6 olefin species boiling in the range from about 20° C. to 100° C. at atmospheric pressure.

C9 MONOMERS: a composition derived from petroleum processing, e.g., cracking, containing unsaturated aromatic C8, C9, and/or C10 olefin species with a boiling range of about 100° C. to 300° C. at atmospheric pressure.

FREELY-ASSOCIATED WATER: water associated with a solid acid catalyst or support where the water is chemisorbed and/or physisorbed.

As a general overview of the present invention, hydrocarbon resins are produced by using at least one of supported metal halides and metal halide solid acids as catalysts for the cationic polymerization of a feed stream containing at least one of pure monomer (e.g., styrene based monomers), C5 monomers, and C9 monomers. Resins with softening points (Ring and Ball) preferably in the range of about 5° C. to 170° C., more preferably about 30° C. to 150° C., can be prepared. These catalysts offer advantages over the traditional unsupported Lewis acid polymerization catalysts since the acid sites are an integral part of the solid or a Lewis acid is supported on a solid. Further, for the supported Lewis acids, the Lewis acid is supported on a solid and therefore can be removed from the reaction solution.

Looking at the present invention in more detail, hydrocarbon resins are prepared through a polymerization reaction wherein a feed stream containing at least one of pure monomer, C5 monomers, and C9 monomers are contacted with a at least one of a supported metal halides and metal halide solid acid catalyst. Supported metal halides and metal halide solid acid catalysts which are useful in the current invention include, but are not limited to, the following.

Lewis Acids on Clays

The Lewis acids on clays including, for example $ZnCl_2$ $AlCl_3$ $AlBr_3$ $BF_3$ $FeCl_3$ $SnCl_4$ $TiCl_4$ $ZrCl_4$ $HfCl_4$ $BCl_3$ $BiCl_3$ Lanthanide halides The clays supporting the Lewis acids including, for example Naturally occurring clay minerals, for example
Kaolinite
Bentonite Attapulgite
Montmorillonite
Clarit
Fuller's Earth
Hectorite
Beidellite
Synthetic clays, for example
    Saponite
    Hydrotalcite
Montmorillonite clays treated with sulfuric or hydrochloric acid
Modified clays (i.e., clays modified by backbone element replacement), e.g.
    Aluminum oxide pillared clays
    Cerium modified alumina pillared clays
    Metal oxide pillared clays
Lewis acids on silica or silica-alumina, for example
    $ZnCl_2$
    $AlCl_3$
    $AlBr_3$
    $BF_3$
    $FeCl_3$
    $SnCl_4$
    $TiCl_4$
    $ZrCl_4$
    $HfCl_4$
    $BCl_3$
    $BiCl_3$
    Lanthanide halides
Lewis acids on mesoporous silica or silica-alumina, for example
    $ZnCl_2$
    $AlCl_3$
    $AlBr_3$
    $BF_3$
    $FeCl_3$
    $SnCl_4$
    $TiCl_4$
    $ZrCl_4$
    $HfCl_4$
    $BCl_3$
    $BiCl_3$
    Lanthanide halides
Lewis acids on ion exchange resins, for example
    $ZnCl_2$
    $AlCl_3$
    $AlBr_3$
    $BF_3$
    $BCl_3$
    $FeCl_3$
    $SnCl_4$
    $TiCl_4$
    $ZrCl_4$
    $HfCl_4$
    $BiCl_3$
    Lanthanide halides
Lewis acids on natural or synthetic zeolites
The Lewis acids on zeolites including, for example
    $ZnCl_2$
    $AlCl_3$
    $AlBr_3$
    $BF_3$
    $BCl_3$
    $FeCl_3$
    $SnCl_4$
    $TiCl_4$
    $ZrCl_4$
    $HfCl_4$
    $BiCl_3$
    Lanthanide halides
The zeolites supporting Lewis acids including, for example
    Zeolite Y
    Zeolite β (i.e., BEA)
    MFI (e.g., "Zeolite Sacony Mobil-5" ("ZSM-5"))
    MEL (e.g., "Zeolite Sacony Mobil-11" ("ZSM-11"))
    NaX
    NaY
    Faujasite (i.e., FAU)
    Mordenite (i.e., MOR)
    Polymer grafted aluminum halides
    Solid Inorganic Acids
    $ZrCl_4$
    $HfCl_4$
    Lanthanide halides As mentioned previously, the above list of supported metal halides and metal halide solid acid catalysts is not intended to be an exhaustive list. In selecting other supported metal halides and metal halide solid acid catalysts which may be useful in the present invention, it is generally true that the supported metal halides and metal halide solid acid catalyst should be more acidic than about −3 on the Hammett scale.

Examples of the lanthanide halides mentioned in the above list include $ScCl_3$, $YCl_3$, $LaCl_3$, $YbCl_3$, $CeCl_3$, $PrCl_3$, $NdCl_3$, $NdBr_3$, $SmCl_3$, $EuCl_3$, $GdCl_3$, $TbCl_3$, $DyCl_3$, $HoCl_3$, $HoBr_3$, $ErCl_3$, $TmCl_3$, and $LuCl_3$.

Concerning the zeolites, the names BEA, MFI, MEL, FAU, and MOR are the framework structure type IUPAC definitions of the listed species.

Examples of polymer grafted aluminum halides mentioned in the above list are found in U.S. Pat. No. 5,414,177 to CHUNG et al. and U.S. Pat. No. 5,409,873 to CHUNG et al., the disclosures of which are herein incorporated by reference in their entireties.

Before use, the solid acid catalysts and/or supports may be treated to remove freely-associated water to maximize the catalyst acidity and activity toward the polymerization. The freely-associated water may be removed by various techniques, including thermal treatment, reduced pressure treatment, dry atmosphere treatment such as nitrogen or air, or a combination thereof. While not wishing to be bound by theory, removing freely-associated water maximizes the acid strength of the Lewis acid catalyst and makes the polymerizations more reproducible.

The freely-associated water may be removed from the solid acid catalyst and/or support by calcining which generally means heating the metal halide solid acid and/or support to high temperature without fusing the catalyst. The metal halide solid acid and/or support may be calcined under an inert atmosphere, such as nitrogen or dry air, or under reduced pressure. The calcining is performed for preferably up to about 8 hours or more, more preferably about 1 hour to 4 hours, preferably at temperatures up to about 700° C., more preferably about 100° C. to 400° C.

The freely-associated water removed from the metal halide solid acid catalyst and/or support may have been derived from water (physisorbed water) or hydroxyl groups (chemisorbed water) associated with the metal halide solid acid catalyst and/or support. By removal of substantially all freely-associated water is meant removing all or essentially all physisorbed water and removing at least a majority of chemisorbed water.

For the supported metal halide acid catalysts, the solid acid catalyst may consist essentially of a single type of a metal halide, e.g., a Lewis acid, on a single type of support. However, the supported metal halide solid acid catalyst may involve any combination of a single type or plurality of types of a metal halide on a single type or plurality of types of supports.

Before the support and the metal halide are combined, the support may be calcined. The importance of calcining the support before the support and metal halide are combined varies depending upon the metal halide. For instance, calcination is critical for supported $AlCl_3$, $AlBr_3$, $BF_3$, $TiCl_4$, $HfCl_4$, $FeCl_3$, and $BCl_3$. Calcination is important for supported $ZrCl_4$ and $BiCl_3$. In contrast, supported $FeCl_3$ and $ZnCl_2$ may be used with or without pre-calcination of the support.

It is expected that by controlling the conditions under which the at least one of supported metal halides and metal halide solid acid catalyst is calcined, such as controlling the temperature or time under which the calcination step takes place, tailoring of the physical properties of the resultant resin, such as its softening point or its molecular weight, may be achieved.

Many of the supported metal halides and metal halide solid acid catalysts of the present invention are most effective in the presence of a controlled amount of water in the feed stream. For instance, the feed stream may include less than about 500 ppm water, preferably less than about 200 ppm water, more preferably less than about 100 ppm water, and most preferably less than about 50 ppm water.

Pure monomer feed streams may contain relatively pure styrene-based monomers such as styrene, alpha-methyl styrene, beta-methyl styrene, 4-methyl styrene, and vinyl toluene fractions. The monomers can be used as pure components or as blends of two or more monomer feeds to give desired resin properties. Preferred blends include about 20 wt % to 90 wt % alpha-methyl styrene with about 80 wt % to 10 wt % of one or more comonomers, preferably styrene, vinyl toluene, 4-methyl styrene or blends of these components. In addition, other alkylated styrenes can be used as monomers in this invention such as t-butyl styrene or phenyl styrene. Feed streams can be dried, if desired, and preferably contain less than about 200 ppm water, more preferably less than about 100 ppm water, and most preferably less than about 50 ppm water.

In the case of C5 resins, the petroleum feed streams contain unsaturated C5 and/or C6 olefins and diolefins boiling in the range from about 20° C. to 100° C., preferably about 30° C. to 70° C. In some cases, cyclopentadiene and methylcyclopentadiene components are removed from the feed by heat soaking at temperatures preferably between about 100° C. and 160° C., and fractionating by distillation. Monomers found in these feedstocks may include but are not limited to olefins such as isobutylene, 2-methyl-2-butene, 1-pentene, 2-methyl-1-pentene, 2-methyl-2-pentene, as well as 2-pentene, cycloolefins such as cyclopentene, and cyclohexene, diolefins such as 1,3-pentadiene, 1,4-pentadiene, isoprene, 1,3-hexadiene, and 1,4-hexadiene, cyclodiolefins such as cyclopentadiene, dicyclopentadiene, and alkyl substituted derivatives and codimers of these cyclodiolefins. Commercial samples of this type of feed include, but are not limited to "Naphtha Petroleum 3 Piperylenes" from Lyondell Petrochemical Company, Houston, Tex., regular "Piperylene Concentrate" or "Super Piperylene Concentrate" both from Shell Nederland Chemie B. V., Hoogvilet, the Netherlands. The C5 feed streams generally contain at least about 70 wt % polymerizable monomers with at least about 50 wt % 1,3-pentadiene. The C5 feed stream may contain low levels of isoprene, generally contains 2-methyl-2-butene, and may contain one or more cyclodiolefins.

Also concerning C5 monomer feed streams, in addition to the reactive components, nonpolymerizable components in the feed may include saturated hydrocarbons which can be codistilled with the unsaturated components such as pentane, cyclopentane, or 2-methylpentane. This monomer feed can be copolymerized with C4 or C5 olefins or dimers as chain transfer agents. Chain transfer agents may be added to obtain resins with lower and narrower molecular weight distributions than can be prepared from using monomers alone. Chain transfer agents stop the propagation of a growing polymer chain by terminating the chain in a way which regenerates a polymer initiation site. Components which behave as chain transfer agents in these reactions include but are not limited to isobutylene, 2-methyl-1-butene, 2-methyl-2-butene or dimers or oligomers of these species. The chain transfer agent can be added to the reaction in pure form or diluted in a solvent. Feed streams can be dried if desired and preferably contain less than about 500 ppm water, more preferably less than about 200 ppm water, and most preferably less than about 50 ppm water.

In the case of C9 monomer resins, the feed streams contain unsaturated aromatic C8, C9, and/or C10 monomers with a boiling range of about 100° C. to 300° C. at atmospheric pressure. Aromatic C8–C10 feed streams (also referred to as C9 feed streams) can be derived from steam cracking of petroleum distillates. Monomers found in these feed stocks may include but are not limited to styrene, vinyl toluene, indene, dicyclopentadiene, and alkylated derivatives of these components. Commercial samples of this type of feed include but are not limited to "LRO-90" from Lyondell Petrochemical Company, Houston, Tex., "DSM C9 Resinfeed Classic" from DSM, Geleen, the Netherlands, "RO-60" and "RO-80" from Dow Chemical Company of Midland, Mich., and "Dow Resin Oil 60-L" from the Dow Chemical Company of Temeuzen, the Netherlands. The C9 feed stream generally contains at least about 20% by weight, preferably about 30% to 75% by weight, and most preferably about 35% to 70% by weight polymerizable unsaturated hydrocarbons. The remainder is generally alkyl substituted aromatics which can be incorporated into the resins by alkylation reactions. Feed streams can be dried if desired and preferably contain less than about 500 ppm water, more preferably less than about 200 ppm water, and most preferably less than about 50 ppm water.

The feed streams may be limited to pure monomer, C5 monomers, or C9 monomers. Alternatively, cofeed streams can be used in combination with main feed streams of pure monomer, C5 monomers, or C9 monomers. Depending upon the main feed stream, pure monomer, C5 monomers, C9 monomers, or even terpenes, and any combination thereof, may serve as a cofeed stream. Terpene feed stocks include but are not limited to d-limonene, alpha- and beta-pinene, as well as dipentene. Resins from blends of main feed streams with cofeed streams may be prepared in the range of about 30 wt % to 95 wt % main feed with about 70 wt % to 5 wt % of a cofeed, preferably about 50–85 wt % main feed and about 50 wt % to 15 wt % cofeed.

The polymerization feed stream preferably contains between about 20 wt % and 80 wt % monomers, more preferably about 30 wt % to 70 wt %, and most preferably about 40 wt % to 70 wt %. In the case of C5 resins, the feed may contain up to about 40 wt % of a chain transfer agent, more preferably up to about 20 wt %, chain transfer agents as discussed above. The feed stream also contains about 80 wt % to 20 wt % of a solvent such as toluene, octane, higher boiling aromatic solvent, aliphatic solvent, or solvent blend.

Regarding the solvents, for pure monomer polymerization, the preferred solvents are aromatic solvents. Typically toluene, xylenes, or light aromatic petroleum solvents such as "Aromatic 100" from Exxon Chemical Company, Houston, Tex., "HiSol 10" from Ashland Chemical Incorporated, Columbus, Ohio, and "Cyclosol 53" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

For C5 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 500 ppm water, preferably less than about 200 ppm water, and most preferably less than about 50 ppm water.

For C9 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

Concerning the polymerization reaction conditions, a first important variable is the amount of at least one of supported metal halides and metal halide solid acid catalyst which is used. The at least one of supported metal halides and metal halide solid acids are preferably used at a level of about 0.1 wt % to 30 wt % based on the weight of the monomer. For pure monomer resins, the at least one of supported metal halides and metal halide solid acid concentration is preferably about 0.1 wt % to 15 wt %, more preferably about 0.5 wt % to 10 wt %, and most preferably about 0.5 wt % to 8 wt %. For C5 monomers, the at least one of supported metal halides and metal halide solid acid concentration is preferably about 0.5 wt % to 30 wt %, more preferably about 1 wt % to 20 wt %, and most preferably about 3 wt % to 15 wt %. For C9 monomers, the at least one of supported metal halides and metal halide solid acid concentration is preferably about 0.5 wt % to 30 wt %, more preferably about 1 wt % to 20 wt %, and most preferably about 3 wt % to 15 wt %.

A second important variable in the reaction is the reaction sequence, i.e., the order and manner in which reactants are combined. In one reaction sequence, the catalyst can be added to a solution of the monomers incrementally while controlling the reaction temperature. Alternatively, in another reaction sequence, the monomer can be added incrementally to a slurry of the at least one of supported metal halides and metal halide solid acid catalyst in a solvent. For a set catalyst level and reaction temperature, substantially lower softening point resins are obtained when the monomer is added to a catalyst slurry. As discussed in more detail in the following paragraphs, lower molecular weights and narrow polydispersity (PD), i.e., Mw/Mn, as measured by size exclusion chromatography, are obtained when the monomer is added to the catalyst solution compared with resins where the catalyst is added to the monomer.

The molecular weight averages of the resins were measured using size exclusion chromatography, SEC. The column set for the analysis consisted of four Waters "Ultrastyragel" columns of 500, 500, 1000, and 100 Å pore size, in series, (Part Nos. WAT 010571, 010571, 010572, 010570 respectively) available from Waters Corporation, Milford, Mass. The molecular weight calibration was calculated from the peak elution times of a standard set of narrow molecular weight distribution polystyrene polymers. The calibration set encompassed 18 standards ranging in peak molecular weight from 162 to 43,900. The peak molecular weight of a narrow molecular weight standard is defined as equal to $(MwMn)^{1/2}$ (ASTM test method D3536-76). The calibration curve is defined by a third degree polynomial curve fit of a plot of log MW vs. $V_e/V_r$, where $V_e$ is the elution volume of the standard and $V_r$ is the elution volume of the reference peak, oxygen, present as dissolved air in the injected solution. The columns and detector cell (Hewlett-Packard Differential Refractometer) are maintained at 40° C. The solvent (mobile phase) was tetrahydrofuran containing 250 ppm butylated hydroxytoluene (BHT, 2,6-di-tert-butyl-4-methylphenol) as a stabilizer (the tetrahydrofaran with BHT being available from Burdick and Jackson, Muskegon, Mich.). The mobile phase reservoir is purged with helium and is maintained at a flow rate of 1 milliliter per minute. Under these conditions, BHT eluted at 35.86 minutes. Samples are dissolved in THF, 0.25% wt/vol, and filtered through a 0.45 micron pore size "TEFLON" (polytetrafluoroethylene) membrane filter prior to injection (200 microliters) into the chromatograph. The reported molecular weights are the "polystyrene equivalent" molecular weights as calculated from the calibration curve.

For the pure monomer resins, the resins produced using the current invention have number average molecular weights (Mn) ranging from about 400 to 2000, weight average molecular weights (Mw) ranging from about 500 to 5000, Z average molecular weights (Mz) ranging from about 500 to 10,000, and polydispersities (PD) as measured by Mw/Mn between about 1.2 and 3.5, typically between about 1.2 and 2.5. For the C5 hydrocarbon resins, the resins produced using the current invention have number average molecular weights (Mn) ranging from about 400 to 2000, weight average molecular weights (Mw) ranging from about 500 to 3500, Z average molecular weights (Mz) ranging from about 700 to 15,000, and polydispersities (PD) as measured by Mw/Mn between about 1.2 and 5, typically between about 1.2 and 3.5. For the C9 hydrocarbon resins, the resins produced using the current invention have number average molecular weights (Mn) ranging from about 400 to 1200, weight average molecular weights (Mw) ranging from about 500 to 2000, Z average molecular weights (Mz) ranging from about 700 to 6000, and polydispersities (PD) as measured by Mw/Mn between about 1.2 and 3.5, typically between about 1.2 and 2.5.

As mentioned previously, it is expected that narrower polydispersities and lower molecular weights are obtained when the monomer is added to the catalyst solution than when the catalyst is added to the monomer. Taking into consideration the effect of the reaction sequence, it is expected that polydispersities more narrow than those obtained using traditional unsupported Lewis acid Friedel-Crafts catalysts can be obtained using the at least one of supported metal halides and metal halide solid acids if desired. Narrow polydispersity is important to ensure compatibility of resin with polymers in end use applications.

A third important reaction variable is the reaction temperature. Polymerization temperatures between about −50° C. and 150° C. can be used in these reactions, however, more preferred reaction temperatures are between about −20° C. and 100° C., most preferred temperatures are between about 0° C. and 70° C. For pure monomer, the reaction temperature is preferably between about −50° C. and 100° C., more preferably between about −20° C. and 75° C., and most preferably between about −10° C. and 60° C. For C5 monomers, the reaction temperature is preferably between about −50° C. and 100° C., more preferably between about −20° C. and 75° C., and most preferably between about −10° and 70° C. For C9 monomers, the reaction temperature is preferably between about 0° C. and 150° C., more preferably between about 10° C. and 120° C., and most preferably between about 20° C. and 110° C. Temperature is found to have a significant effect on the properties of the resulting resins. Higher molecular weight and high softening point resins are prepared at lower reaction temperatures. The reaction time at reaction temperature is preferably between about 30 minutes and 8 hours, and more preferably between about 1 hour and 4 hours.

The polymerization process can be carried out as a continuous, semi-batch, or batch process in such diverse reactors as continuous, batch, semi-batch, fixed bed, fluidized bed, and plug flow. For instance, in continuous processes, a solution of the monomers can be passed over the catalyst in a fixed bed, or the monomers can be cofed with a catalyst slurry into a continuous reactor.

The reaction may be stopped by physically separating the at least one of supported metal halides and metal halide solid catalysts from the products. Physical separation may render the reaction solution neutral. Furthermore, physical separation can be performed by simple filtration or by separation of the resin solutions from a fixed catalyst bed. As a result, physical separation is easy and complete such that, for many the at least one of supported metal halides and metal halide solid acid catalysts, acid functionality and catalyst residue are not left in the resin product.

If leaching of acid is possible, then acid neutralization is required. This step is commonly known in the art as "quenching". For the at least one of supported metal halides and metal halide solid acid catalysts of the present invention which require quenching, less salt is generated than by traditional unsupported Lewis acid catalysts.

Thus, use of the at least one of supported metal halides and metal halide solid acid catalysts minimizes or eliminates the need for extra processing steps to quench the reactions, neutralize the catalyst, and filter the catalyst salt residues from the resulting products.

Once the at least one of supported metal halides and metal halide solid acid catalyst and resin solution are separated, the resin solution can be stripped to remove unreacted hydrocarbons, solvents, and low molecular weight oligomers which can be recycled through the process. When pure monomer is reacted, water white resins can be obtained from this invention in yields of up to about 99% based on starting monomer.

Resins obtained from this invention typically have softening points as measured by ASTM-E28 "Standard Test Method for Softening Point by Ring and Ball Apparatus" (revised 1996), varying from preferably about 5° C. to 170° C., more preferably from about 30° C. to 150° C. For pure monomer, the softening points preferably range from about 5° C. to 170° C., more preferably from about 50° C. to 150° C. For C5 hydrocarbon resins, the softening point ranges from preferably about 5° C. to 170° C., more preferably from about 50° C. to 150° C., and most preferably about 70° C. to 130° C. For C9 hydrocarbon resins, the softening point is preferably up to about 170° C., and the softening point range is most preferably from about 70° C. to 160° C. Flowable resin or those that are liquids at room temperature can also be prepared if desired using proper reaction conditions.

After the resin is produced, it may be subsequently subjected to hydrogenation to reduce coloration and improve color stability. Hydrogenation of resins is well known in the art. For a discussion of hydrogenation, reference is made to U.S. Pat. No. 5,491,214 to DAUGHENBAUGH et al., which is incorporated herein by reference in its entirety.

The resins of the current invention can be used as modifiers in adhesives, sealants, printing inks, protective coatings, plastics, road markings, flooring, and as dry cleaning retexturizing agents.

The at least one of supported metal halides and metal halide solid acid catalysts of the present invention offer several advantages over unsupported Lewis acids (e.g., $AlCl_3$, $AlBr_3$, $BF_3$, complexes of $BF_3$, $TiCl_4$, and others which are traditionally used for Friedel-Crafts polymerizations). Many of these advantages are a result of the acid sites being an integral part of the solid catalysts or a Lewis acid supported on a solid.

Because the acid sites are an integral part of the solid catalyst or the Lewis acid is supported on a solid, contamination of the resin products or solvents with catalyst residues is minimal. As a result, the at least one of supported metal halides and metal halide solid acid catalysts do not impart color to the hydrocarbon resins due to catalyst residues. If pure styrene-based monomers are used, the resulting resins can be water white.

The at least one of supported metal halides and metal halide solid acid catalysts of the present invention can generally be regenerated and recycled to thereby minimize waste disposal of spent catalyst. In contrast, the unsupported Lewis acids are generally single use catalysts.

Further, the at least one of supported metal halides and metal halide solid acid catalysts of the present invention are nonhazardous when compared with traditional unsupported Lewis acid catalysts such as $BF_3$ and $AlCl_3$. The catalysts of the present invention generally do not generate corrosive or hazardous liquid or gaseous acids on exposure to moisture.

The present invention will be further illustrated by way of the following Examples. Examples 1–17 involve pure monomer resins, Examples 18–53 involve C5 resins, and Examples 54–76 involve C9 resins. These examples are non-limiting and do not restrict the scope of the invention.

Unless stated otherwise, all percentages, parts, etc. presented in the examples are by weight.

EXAMPLES 1–3

These examples illustrate the effect of zinc chloride supported on silica as a catalyst for the polymerization of pure monomer.

Catalyst preparation involves dissolving 20 grams of reagent grade zinc chloride in 75–100 ml methanol and adding to a slurry of synthetic amorphous silica, Grade "EP-12", Crosfield Limited, Warrington, England. The solution is stirred for 1 hour. The solvent is slowly removed on a rotary evaporator to avoid bumping of the mixture. After the rotary evaporation, the material should be a free flowing solid. The catalyst is calcined by carefully heating the solid for 2 hours at 2 mm of Hg at 40° C., followed by 2 hours at 2 mm of Hg at 100° C., and finished at 1 hour at 2 mm of Hg at 140° C. The catalyst is handled in a nitrogen filled glove bag prior to use.

Catalyst recycle tests were done in a jacketted one gallon reactor with a flat-bed turbine agitator, cooling coil, sample line, thermowell, bottom valve and sintered metal filters. The filters were located on the end of the sample line and in the bottom valve seat of the reactor and had anominal rating of 7 microns. The jacket of the reactor was controlled at 0° C.±5° C. Thirty-five (35) grams of the supported zinc chloride catalyst described above and 1000 grams of toluene were added to the reactor. The catalyst/toluene mixture was cooled to 0° C.

A mixture of 866 grams of alpha-methyl styrene and 366 grams of styrene were pumped into the 1 gallon reactor at a rate such that the temperature was controlled to 0° C.±5° C. by flowing −20° C. fluid through the cooling coil. The time for pumping in the monomer was 100 minutes. The reactor was held at 0° C. for an additional 3 hours. The catalyst was contained in the reactor by using the two in situ filters. One gram of catalyst was removed and one gram of fresh catalyst was added between each of the catalyst recycle tests. An aliquot of the filtered reaction mixture was rotary evaporated, with an end condition of 3 mm of Hg and 190° C. to produce a resin product.

Subsequent reactions using the same catalyst were done in essentially the same manner. The yield and properties of the resins are listed in Table 1.

TABLE 1

| Ex. | Catalyst | Yield | Softening Point (R&B) | Molecular Weight | | |
| --- | --- | --- | --- | --- | --- | --- |
| | | | | Mn | Mw | Mz |
| 1 | ZnCl$_2$ on silica | 87% | 135° C. | 1176 | 2407 | 4492 |
| 2 | Catalyst recycled from Example 1 | 76% | 142° C. | 1431 | 3268 | 6825 |
| 3 | Catalyst recycled from Example 2 | 59% | 142° C. | 1383 | 3467 | 7486 |

EXAMPLES 4 AND 5

The following examples illustrate the preparation of pure monomer resins using a catalyst to monomer addition scheme with styrene based monomers and a supported ZnCl$_2$ on silica catalyst.

Catalyst Preparation

Zinc chloride (98% Aldrich, Milwaukee, Wis.), 5.0 grams (0.037 mol), was dissolved in 50 milliliters of methanol (reagent grade, Aldrich, Milwaukee, Wis.). The support material, 13.5 grams, ("EP12" silica from Crosfield Catalysts, Warrington, England which had been calcined at 150° C. under vacuum to remove excess water for the purpose of obtaining an accurate weight of the support) was added to the methanol solution. The slurry was stirred at room temperature for 30 minutes. The solvent was removed on a rotary evaporator at 2–5 mm Hg with mild heating to obtain a flowable powder. The catalyst was calcined at 150° C. under a dry nitrogen purge for 2 hours prior to use.

Polymerization

A 500 milliliter three neck flask was equipped with an overhead stirrer, reflux condenser, gas inlet and outlet ports, thermometer, and a dropping addition finnel. The flask was charged with 86.6 grams alpha-methyl styrene (reagent grade, Aldrich, Milwaukee, Wis.), 36.6 grams styrene (reagent grade, Aldrich, Milwaukee, Wis.), and 36.6 grams toluene (reagent grade, Aldrich, Milwaukee, Wis.). The monomers and solvent were dried as follows: the styrene based monomers were dried by passing through a column of activated alumina (Fischer 8–16 mesh, 0.3 grams alumina to 1 milliliter monomer) immediately prior to use, the toluene was dried over 3 angstrom molecular sieves prior to use.

The catalyst, 3.7 grams ZnCl$_2$/SiO$_2$—prepared as described above, was transferred to the solid addition funnel in an inert, moisture free atmosphere. The catalyst was added to the reaction from the dropping addition funnel over 15 minutes maintaining the target reaction temperature with external cooling of the reaction flask. The reaction was stirred at temperature for a total reaction time of 1–2 hour.

After the reaction time was completed, the resulting resin solution was vacuum filtered from the catalyst at room temperature. The reaction flask and catalyst filter cake were rinsed with approximately 100 milliliters of toluene.

After catalyst filtration, the solvent was removed from the resin solution at 100° C. at 2–5 mm Hg. The resin oil was placed in a round-bottom flask which was fitted with a distillation head with an adaptor for an inlet tube, thermometer, and attached to a condenser and receiving flask. The resin oil was heated to 235° C. with a nitrogen purge followed by asteam purge at 235–245° C. to remove the light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resin produced has the properties listed in Table 2.

TABLE 2

| Example | Reaction Temperature | Yield | Softening Point (R&B) | Molecular Weight | | |
| --- | --- | --- | --- | --- | --- | --- |
| | | | | Mn | Mw | Mz |
| 4 | 0° C. | 69% | 150° C. | 1770 | 4050 | 8250 |
| 5 | 25° C. | 83% | 122° C. | 960 | 1470 | 2430 |

EXAMPLES 6–16

The following examples illustrate a range of resin properties available from the current invention using styrene and alpha-methyl styrene as the monomers and a calcined ZnCl$_2$ on silica as the catalyst. When combined, the following examples serve to define a half factorial designed experiment with two variables. The variables in these experiments include reaction temperature and catalyst loading. Replicate points are included to estimate experimental error. The results from the following examples are used to generate a model equation for each measured response in terms of the variables studied. The responses studied in these examples include: product yield, Ring and Ball softening point, and molecular weight distribution, as defined by number average molecular weight (Mn), weight average molecular weight (Mw), and Z average molecular weight (Mz).

Catalyst Preparation

Zinc chloride (98% Aldrich, Milwaukee, Wis.) 20.0 grams (0.15 mol) was dissolved in 300 milliliters of methanol (reagent grade, Aldrich, Milwaukee, Wis.). The support material, 80 grams, ("EP12" silica from Crosfield Catalysts, Warrington, England) was added to the methanol solution. The slurry was stirred at room temperature for 30 minutes. The solvent was removed on a rotary evaporator at 2–5 mm Hg with mild heating to obtain a flowable powder. Prior to use, the catalyst was calcined for 2 hours at 40° C., 1 hour at 100° C., and 2 hours at 150° C. all under vacuum.

Polymerization

A 500 milliliter three neck flask was equipped with an overhead stirrer, reflux condenser, gas inlet and outlet ports, thermometer, and a dropping addition funnel. The flask was charged with 86.6 grams alpha-methyl styrene (reagent grade, Aldrich, Milwaukee, Wis.), 36.6 grams styrene (reagent grade, Aldrich, Milwaukee, Wis.), and 36.6 grams toluene (reagent grade, Aldrich, Milwaukee, Wis.). Immediately prior to use, the styrene based monomers were dried by passing through a column of activated alumina (Fischer 8–16 mesh, 0.3 grams alumina to 1 milliliter monomer). Also prior to use, the toluene was dried over 3 angstrom molecular sieves.

The catalyst, prepared as described above, was transferred to the dropping addition funnel in an inert, moisture free atmosphere. The catalyst was added to the reaction from the dropping addition funnel over 15 minutes maintaining the target reaction temperature with external cooling of the reaction flask. The reaction solution was stirred at temperature for a total reaction time of 1 hour.

After completion of the reaction time, the resulting resin solution was vacuum filtered from the catalyst at room temperature. The reaction flask and catalyst filter cake were rinsed with approximately 100 milliliters of toluene.

After catalyst filtration, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The reaction conditions for each example are outlined in the Table 3 below. The level of each variable was coded as −1, 0, or 1 for low, middle, and high, respectively. Use of coded variable values facilitates generation of the model equations for each response. Coded values are included in parenthesis.

TABLE 3

| Ex. | Catalyst Loading (wt %) | Reaction Temp. | Yield | Softening Point (R&B) | Molecular Weight | | |
|---|---|---|---|---|---|---|---|
| | | | | | Mn | Mw | Mz |
| 6 | 3.25 (0) | 25° C. (0) | 74% | 118° C. | 910 | 1470 | 2420 |
| 7 | 1 (−1) | 50° C. (1) | 72% | 68° C. | 610 | 830 | 1130 |
| 8 | 6 (1) | 25° C. (0) | 86% | 100° C. | 960 | 1550 | 2630 |
| 9 | 1 (−1) | 0° C. (−1) | 10% | 142° C. | 1240 | 2080 | 4400 |
| 10 | 3.25 (0) | 50° C. (1) | 73% | 76° C. | 660 | 890 | 1220 |
| 11 | 3.25 (0) | 25° C. (0) | 77% | 125° C. | 1000 | 1680 | 2810 |
| 12 | 6 (1) | 50° C. (1) | 18% | 70° C. | 450 | 480 | 520 |
| 13 | 3.25 (0) | 0° C. (−1) | 36% | 131° C. | 1650 | 3100 | 5700 |
| 14 | 1 (−1) | 25° C. (0) | 64% | 133° C. | 1080 | 1680 | 2620 |
| 15 | 6 (1) | 0° C. (−1) | 70% | 139° C. | 2130 | 5490 | 11780 |
| 16 | 3.25 (0) | 25° C. (0) | 63% | 103° C. | 790 | 1150 | 2110 |

The data from the above tables was analyzed by regression analysis for each of the responses (steam stripped product yield, Ring and Ball softening point, Mn molecular weight, Mw molecular weight, and Mz molecular weight). The process variables, (reaction temperature (TMP) and catalyst loading (CAT), were coded to −1, 0, and 1 for the low, mid, and high levels respectively. The following regression models were obtained based on the coded variables. The proportion of the variation in the response data that is explained by the models is listed as $R^2(adj)$.

Equation 1

$$\text{Resin Yield \%} = 72.8 - 29.3(CAT)(TMP) - 26.3(TMP)^2 \quad R^2(adj) = 78.9\%$$

Equation 2

$$\text{R \& B Softening Point} = 110 - 33.0(TMP) \quad R^2(adj) = 82.1\%$$

Equation 3

$$\ln[Mn] = 6.86 - 0.537(TMP) - 0.214(CAT)(TMP) \quad R^2(adj) = 93.7\%$$

Equation 4

$$\ln[Mw] = 7.32 - 0.780(TMP) - 0.385(CAT)(TMP) \quad R^2(adj) = 94.0\%$$

Equation 5

$$\ln[Mz] = 7.81 - 1.02(TMP) - 0.45(CAT)(TMP) \quad R^2(adj) = 96.4\%$$

Figure 2:
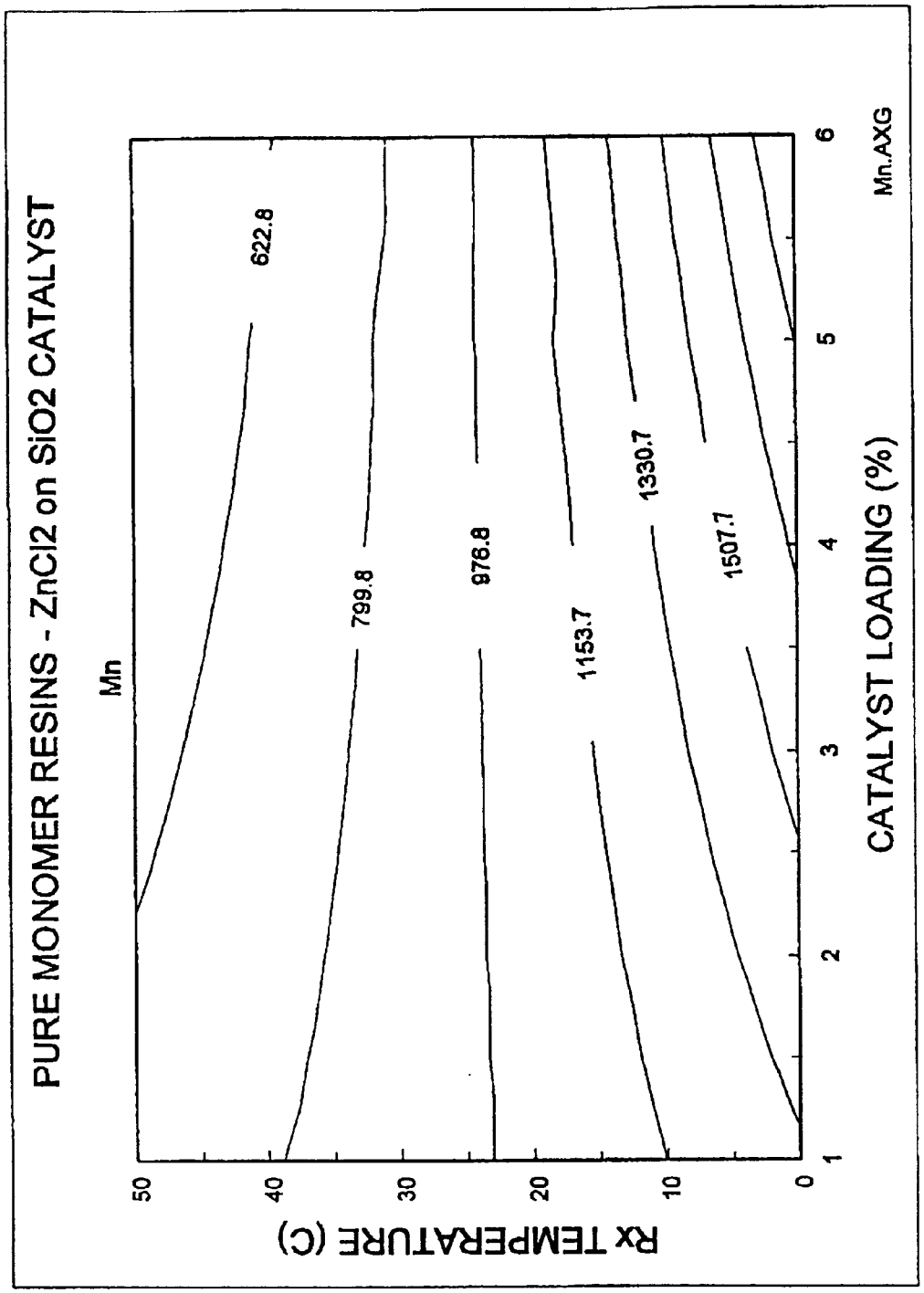
Figure 3:
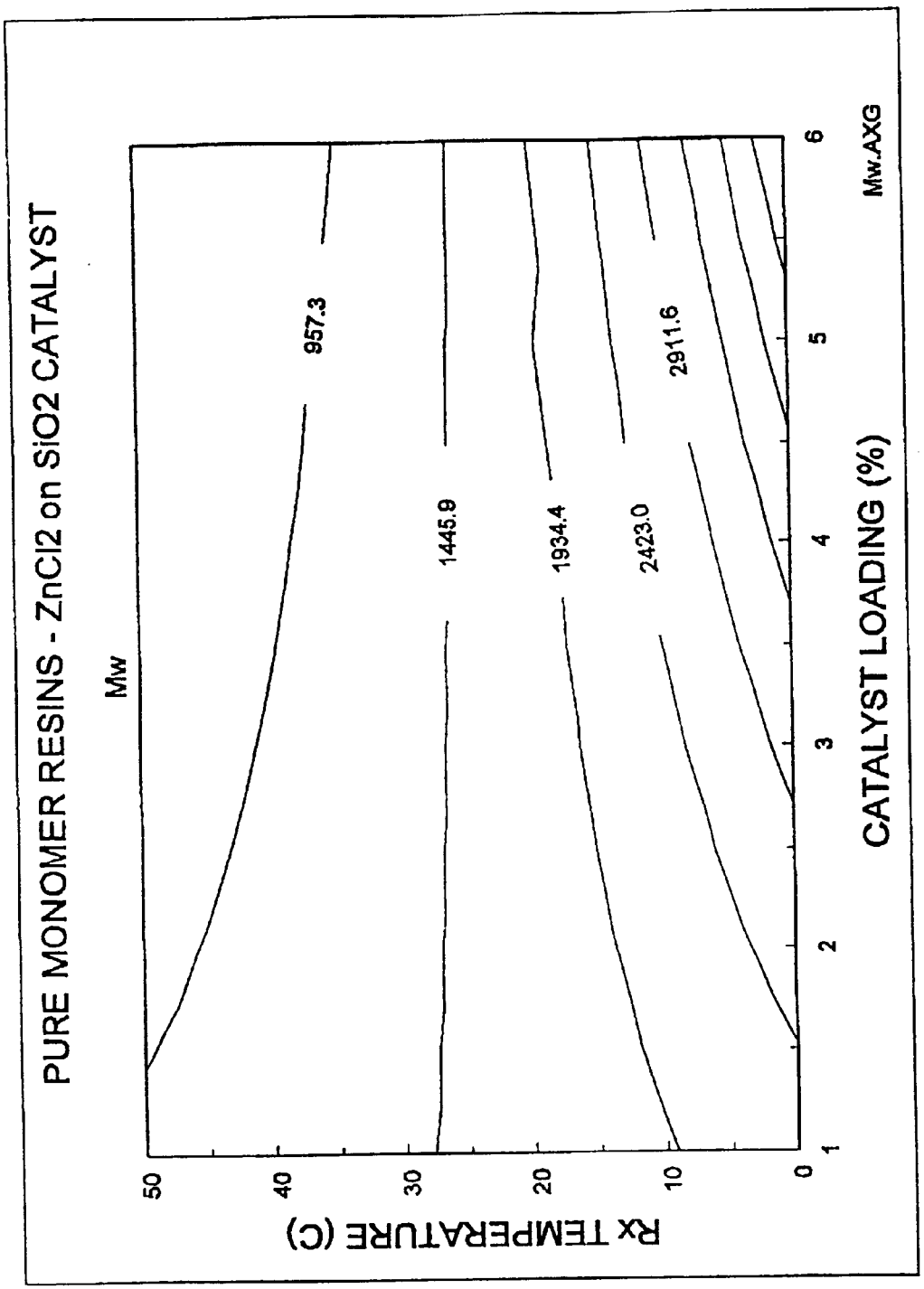
Figure 4:
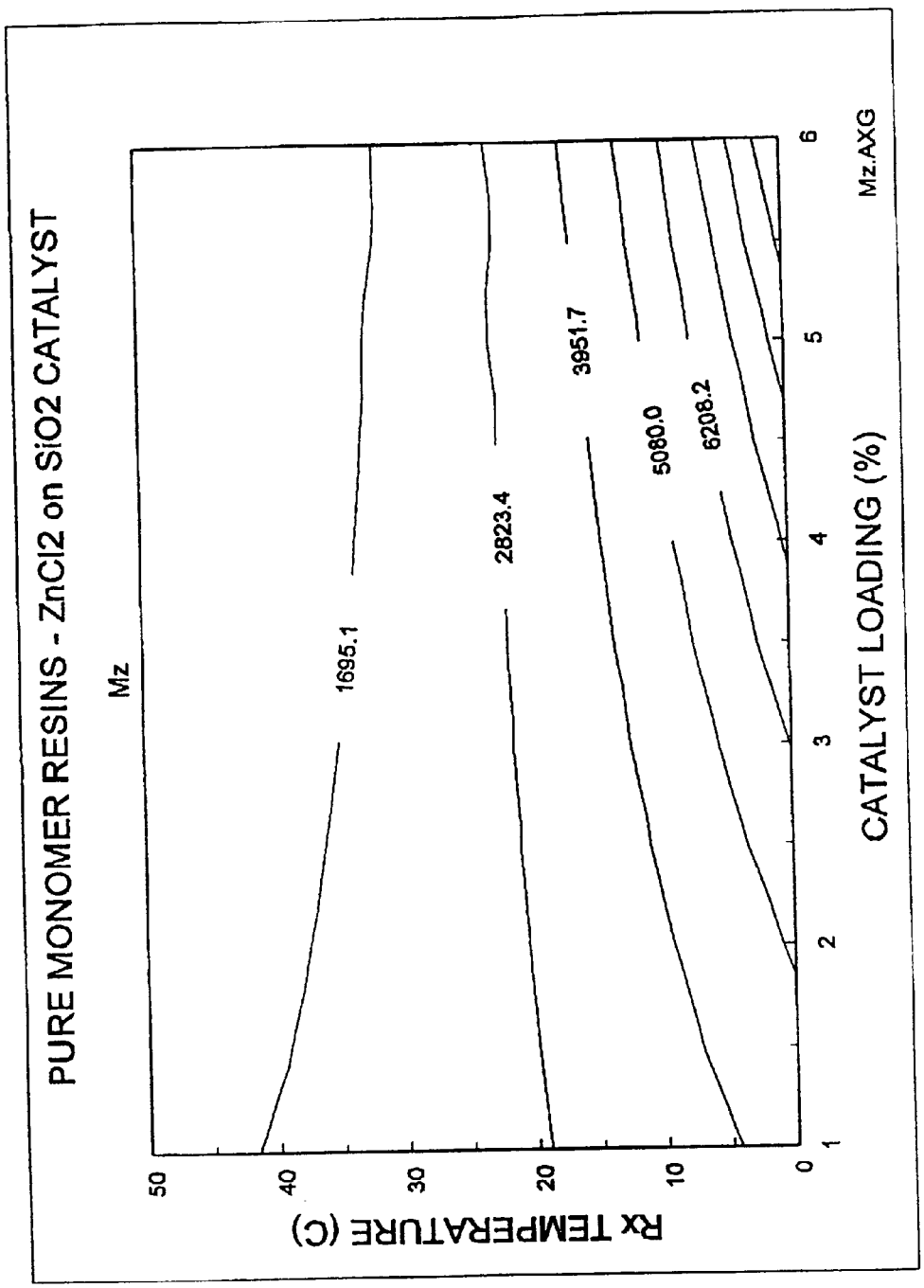

The regression equations listed above can be used to predict the properties of all resins which can be obtained for a set of reaction conditions where the control variables lie within the intervals tested. Contour plots can be generated to investigate the factor effects and make comparisons of resin properties predicted to be generated using various reaction conditions. Sample contour plots are shown in FIGS. 1–4 for product yield, Mn, Mw, and Mz molecular weights versus catalyst loading and reaction temperature.

EXAMPLE 17

This example demonstrates the use of supported aluminum trichloride as a catalyst for the polymerization of styrene based monomers.

Catalyst Preparation

Aluminum chloride (−40 mesh, Vanchlor Co., Inc., Lockport, N.Y.), 20.0 grams (0.15 mol), was dissolved in 100 milliliters of toluene dried over 4 angstrom molecular sieves (reagent grade, Aldrich, Milwaukee, Wis.). The support material, 80 grams, ("EP12" silica from Crosfield Catalysts, Warrington, England) was dried prior to contacting the aluminum trichloride solution for 2 hours at 40° C., 1 hour at 100° C., and 2 hours at 150° C. all under vacuum. The aluminum trichloride solution was added to the dried support material and the resulting slurry was stirred at room temperature for 30 minutes. The solvent was removed under vacuum at 2–5 mm Hg while maintaining the temperature near 40° C. to obtain a flowable powder. Prior to use, the catalyst was stored and handled in an inert atmosphere.

Polymerization

A 500 milliliter three neck flask was equipped with an overhead stirrer, reflux condenser, gas inlet and outlet ports, thermometer, and a dropping addition funnel. The flask was charged with 86.6 grams alpha-methyl styrene (reagent grade, Aldrich, Milwaukee, Wis.), 36.6 grams styrene (reagent grade, Aldrich, Milwaukee, Wis.), and 36.6 grams toluene (reagent grade, Aldrich, Milwaukee, Wis.). Immediately prior to use, the styrene based monomers were dried by passing through a column of activated alumina (Fischer 8–16 mesh, 0.3 grams alumina to 1 milliliter monomer). Prior to use, the toluene was dried over 3 angstrom molecular sieves.

The catalyst, 2.5 wt % based on monomer, was transferred to the dropping addition funnel in an inert, moisture free atmosphere. The catalyst was added to the reaction from the dropping addition funnel over 15 minutes maintaining a 25° C. reaction temperature with external cooling of the reaction flask. The reaction solution was stirred at temperature for a total reaction time of 1 hour.

After completion of the reaction time, the resin solution was vacuum filtered from the catalyst at room temperature. The reaction flask and catalyst filter cake were rinsed with approximately 100 milliliters of toluene.

After catalyst filtration, the resin oil was placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The following summarizes the reaction conditions and resin properties.

| Reaction temperature | 25° C. |
|---|---|
| Resin yield | 24% |
| Ring and Ball Softening Point | 59° C. |
| Molecular Weight | |
| Mn | 520 |
| Mw | 600 |
| Mz | 740 |

EXAMPLES 18–22

These examples illustrate the effect of zinc chloride supported on a variety of substrates as a catalyst for the polymerization of piperylene concentrate, a C5 feed.

Catalyst Preparation

Zinc chloride (98% Aldrich, Milwaukee, Wis.) 27.3 grams (0.2 mol) was dissolved in 300 milliliters of methanol (reagent grade, Aldrich, Milwaukee, Wis.). The support material, 100 grams, ("F-22" and "F-6" acid treated clays from Engelhard, Iselin, N.J., "K-10" acid treated clay from Sud Chemie, Munich, Germany, or "EP122" silica from Crosfield Catalysts, Warrington, England) was added to the methanol solution. The slurry was stirred at room temperature for 30 minutes. The solvent was removed on a rotary evaporator at 2–5 mm Hg with mild heating to obtain a flowable powder. The catalyst was calcined at 150° C. under a dry nitrogen purge for 2 hours prior to use.

Polymerization

A 500 milliliter three neck flask was equipped with an overhead stirrer, reflux condenser, gas inlet and outlet ports, a thermometer, and a dropping addition funnel. The flask was charged with 60 grams of toluene (reagent grade, Aldrich Milwaukee, Wis.) and 14 grams of the supported zinc chloride catalyst as prepared above. The catalyst slurry was heated to 50° C. with stirring.

Piperylene concentrate (Naphtha Petroleum 3 "Piperylenes", Lyondell Petrochemical Company, Houston, Tex.), 140 grams, was added to the nitrogen purged reaction flask via the dropping addition funnel over 15 minutes. Immediately prior to use, the monomers and solvent were dried as follows, the solvents were dried over 4 angstrom molecular sieves and the piperylene concentrate was dried by passing through a column of activated alumina (Fischer 8–16 mesh, 0.3 grams of alumina to 1 milliliter of monomer).

The reaction solution was stirred at 50° C. for a total reaction time of one hour. The resulting resin solution was separated from the catalyst by vacuum filtration at room temperature. The volatile components and solvent were removed by heating the reaction solution to 50° C. under vacuum (2–5 mm Hg) for 2 hours. The flask was fitted with a distillation head with an adaptor for an inlet tube and a thermometer, and attached to a condenser and receiving flask. The resin oil in the flask was then heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 4. Examples 18–21 are in accordance with the present invention, whereas Comparative Example 22 is for comparison purposes.

TABLE 4

| Exam-ple | Catalyst | Yield | Softening Point (R&B) | Molecular Weight | | |
|---|---|---|---|---|---|---|
| | | | | Mn | Mw | Mz |
| 18 | $ZnCl_2$ on F-22 Clay | 13% | 40° C. | 1520 | 2710 | 6500 |
| 19 | $ZnCl_2$ on F-6 Clay | 28% | 41° C. | 1400 | 2490 | 6760 |
| 20 | $ZnCl_2$ on K-10 Clay | 13% | — | 1160 | 2180 | 5160 |
| 21 | $ZnCl_2$ on EP12 silica | 64% | 44° C. | 1350 | 2360 | 4320 |
| 22 | $ZnCl_2$ unsupported | 0% | — | — | — | — |

EXAMPLES 23–25

These examples illustrate the effect of reaction temperature on the polymerization of piperylene concentrate, a C5 feed, with zinc chloride supported on silica.

Reaction procedures are similar to those listed for Examples 18–22. The catalyst used was $ZnCl_2$ on "EP12" silica prepared as described in Example 7 above. The reaction temperature was varied as described in the Table 5 below with the properties of the resulting resin also listed in Table 5.

TABLE 5

| Exam-ple | Catalyst and Reaction Temperature | Yield | Softening Point (R&B) | Molecular Weight | | |
|---|---|---|---|---|---|---|
| | | | | Mn | Mw | Mz |
| 23 | $ZnCl_2/SiO_2$ - 50° C. | 50% | 30° C. | 1000 | 1710 | 3260 |
| 24 | $ZnCl_2/SiO_2$ - 25° C. | 29% | 27° C. | 1410 | 2300 | 3600 |
| 25 | $ZnCl_2/SiO_2$ - 0° C. | 14% | 31° C. | 1480 | 2640 | 4360 |

EXAMPLES 26–36

These examples illustrate the effect of zinc chloride loading on silica and the total zinc loading in the reaction on the polymerization of piperylene concentrate, a C5 feed. At a constant wt % $ZnCl_2$ based on monomer, higher resin yields are obtained at lower loadings of $ZnCl_2$ on the silica. For a given loading of $ZnCl_2$ on silica, higher yields are obtained at higher loadings of catalyst with respect to monomer.

Catalyst Preparation

Catalyst A

Zinc chloride on silica was prepared as described in Example 21.

Catalyst B

Zinc chloride (98% Aldrich, Milwaukee, Wis.) 13.7 grams (0.059 mol) was dissolved in 150 grams of methanol (reagent grade, Aldrich, Milwaukee, Wis.). The support material, 25 grams, ("EP12" silica from Crosfield Catalysts, Warrington, England) was added to the methanol solution. The slurry was stirred at room temperature for 30 minutes. The solvent was removed on a rotary evaporator at 2–5 mm Hg with mild heating to obtain a flowable powder. The catalyst was calcined at 150° C. under a dry nitrogen purge for 2 hours prior to use.

Catalyst C, D, and E

The procedures for preparing catalysts C–E were similar to the procedures outlined for catalyst B. The zinc chloride loading for each catalyst is as follows, 20.5 grams for catalyst C, 27.3 grams for catalyst D, and 34.2 grams for catalyst E using 25 grams of silica.

Polymerization

Preparation of the resins was as described for Examples 18–22. Catalysts and catalyst loadings were as described in the Table 6 and the resulting resin had the properties listed in Table 6.

TABLE 6

| Example | Cat. | Loading Cat. wt % | Loading ZnCl$_2$ wt % | Yield | Softening Point (R&B) | Molecular Weight Mn | Mw | Mz |
|---|---|---|---|---|---|---|---|---|
| 26 | A | 10 | 2.1 | 64% | 44° C. | 1350 | 2360 | 4320 |
| 27 | B | 3.6 | 1.3 | 23% | 39° C. | 1630 | 3000 | 5400 |
| 28 | B | 6.1 | 2.1 | 26% | 43° C. | 1690 | 3050 | 5390 |
| 29 | B | 10 | 3.5 | 39% | 42° C. | 1540 | 2810 | 4960 |
| 30 | C | 3.4 | 1.5 | 12% | 21° C. | 1370 | 2290 | 4930 |
| 31 | C | 4.8 | 2.1 | 21% | 25° C. | 1410 | 2220 | 3750 |
| 32 | C | 10 | 4.5 | 34% | 19° C. | 1270 | 1990 | 3110 |
| 33 | D | 2.5 | 1.3 | 6% | 41° C. | 1890 | 3660 | 6810 |
| 34 | D | 4.1 | 2.1 | 11% | 38° C. | 1790 | 3270 | 5820 |
| 35 | D | 10 | 5.2 | 27% | 39° C. | 1550 | 2970 | 5560 |
| 36 | E | 3.7 | 2.1 | 7% | 25° C. | 1520 | 2540 | 4480 |

EXAMPLES 37–39

These examples illustrate the effect of unsupported metal halides as catalysts for the polymerization of piperylene concentrate, a C5 feed. In particular, these examples compare the effectiveness of the solid acid catalyst ZrCl$_4$ with the effectiveness of the conventional Lewis acids FeCl$_3$ and AlCl$_3$.

A 500 milliliter three neck flask was equipped with an overhead stirrer, reflux condenser, gas inlet and outlet ports, a thermometer, and a dropping addition funnel. The flask was charged with 30 grams toluene (reagent grade, Aldrich Milwaukee, Wis.) and 0.008 moles of the metal chloride catalyst, FeCl$_3$ 97%, ZrCl$_4$ 99.9+% (all from Aldrich, Milwaukee, Wis.) and AlCl$_3$ (Vanchlor Co. Inc., Lockport, N.Y.). The catalyst slurry was heated to 50° C. with stirring.

Piperylene concentrate (Naphtha Petroleum 3 "Piperylenes", Lyondell Petrochemical Company, Houston, Tex.), 100 grams, was added to the nitrogen purged reaction flask via the dropping addition funnel over 15 minutes. Immediately prior to use, the monomers and solvent were dried as follows, the solvent was dried over 4 angstrom molecular sieves and the piperylene concentrate was dried by passing through a column of activated alumina (Fischer 8–16 mesh, 0.3 grams of alumina to 1 milliliter of monomer).

The reaction solution was stirred at 50° C. for a total reaction time of two hours. Catalyst solids were removed from the reaction solution via filtration. After filtration, the reaction solutions were quenched with 4 milliliters of NH$_4$OH in 100 milliliters of water and the water removed using a separatory funnel. After quenching, the resin solution was separated from the catalyst salts formed during quenching by vacuum filtration at room temperature.

The resin oil was then placed in a round-bottom flask which was fitted with a distillation head with an adaptor for an inlet tube and a thermometer, and attached to a condenser and a receiving flask. The resin oil was heated to 200° C. to 235° C. with a nitrogen purge for all resins, followed by a steam purge at 235–245° C. to remove light oil products for the AlCl$_3$ and ZrCl$_4$ reactions. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 7. Examples 37 and 39 are in accordance with the invention, whereas Comparison Example 38 is for comparison purposes.

TABLE 7

| Example | Catalyst | Yield | Softening Point (R&B) | Molecular Weight Mn | Mw | Mz |
|---|---|---|---|---|---|---|
| 37 | FeCl$_3$ | 7%[1] | — | 950 | 3750 | 16910 |
| 38 | AlCl$_3$ | 52% | 95° C. | 1580 | 3120 | 6790 |
| 39 | ZrCl$_4$ | 52% | 68° C. | 2250 | 5730 | 15160 |

[1]Sample was not steam stripped.

EXAMPLES 40–44

These examples illustrate the effect of supported metal halides as catalysts for the polymerization of piperylene concentrate, a C5 feed.

Catalyst Preparation

Supported ZnCl$_2$ and FeCl$_3$

Zinc chloride, 98+%, or iron chloride, 97%, (both from Aldrich, Milwaukee, Wis.) 6 grams was dissolved in 100 milliliters of methanol (Reagent grade, Aldrich, Milwaukee, Wis.). The support material, 24 grams, ("EP12" silica from Crosfield Catalysts, Warrington, England) was added to the methanol solution. The slurry was stirred at room temperature for 30 minutes. The solvent was removed on a rotary evaporator at 2–5 mm Hg with mild heating to obtain a flowable powder. The catalyst was calcined at 150° C. under a dry nitrogen purge for 2 hours prior to use.

Supported BiCl$_3$, AlCl$_3$, and ZrCl$_4$

The silica support material ("EP12" from Crosfield Catalysts, Warrington, England) was dried under vacuum, 2–5 mm Hg, using the following thermal cycle, 0.5 hours at room temperature, 1 hour at 35–40° C., 1.5 hours at 100°, and 2 hours at 150° C. The dried support was added to the reaction flask under an inert atmosphere with the desired metal halide, 6 grams, (bismuth chloride or zirconium tetrachloride from Aldrich, Milwaukee, Wis., or aluminum chloride from Vanchlor Chemical, Inc., Lockport, N.Y.). Toluene, 100 ml, was added via syringe to the solids. The catalyst slurry was stirred at ambient temperature for one hour and the solvent removed under vacuum, 2–5 mm Hg, maintaining the temperature near 20° C. Drying the flowable solid continued under vacuum at ambient temperature for 3 hours.

Polymerization

A 500 milliliter three neck flask was equipped with an overhead stirrer, reflux condenser, gas inlet and outlet ports, a thermometer, and a dropping addition funnel. The flask was charged with 30–50 grams of toluene (reagent grade, Aldrich Milwaukee, Wis.) and 0.011 moles of the metal chloride on the catalyst support as prepared above. The catalyst slurry was heated to 50° C. with stirring.

Piperylene concentrate (Naphtha Petroleum 3 "Piperylenes", Lyondell Petrochemical Company, Houston, Tex.), 100 grams, was added to the nitrogen purged reaction flask via the dropping addition funnel over 15 minutes. Immediately prior to use, the monomers and solvent were dried as follows, the solvent was dried over 4 angstrom molecular sieves and the piperylene concentrate was dried by passing through a column of activated alumina (Fischer 8–16 mesh, 0.3 grams of alumina to 1 milliliter of monomer).

The reaction solution was stirred at 50° C. for a total reaction time of two hours. Catalyst solids were removed from the reaction solution via filtration. The reaction solutions were quenched with 4 milliliters of $NH_4OH$ in 100 milliliters of water and the water removed using a separatory funnel. After quenching, the resin solution was separated from any catalyst salt residues formed during quenching by vacuum filtration at room temperature.

The resin oil was then placed in a round-bottom flask which was fitted with a distillation head with an adaptor for an inlet tube and a thermometer, and attached to a condenser and a receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 8.

TABLE 8

| Example | Catalyst | Yield | Softening Point (R&B) | Mn | Mw | Mz |
|---|---|---|---|---|---|---|
| 40 | $BiCl_3/SiO_2$ | 11% | — | 1290 | 1900 | 6300 |
| 41 | $ZnCl_2/SiO_2$ | 37% | 42° C. | 1780 | 2990 | 5340 |
| 42 | $FeCl_3/SiO_2$ | 7% | — | 950 | 2360 | 10800 |
| 43 | $AlCl_3/SiO_2$ | 41% | 54° C. | 990 | 1490 | 2410 |
| 44 | $ZrCl_4/SiO_2$ | 55% | 60° C. | 1310 | 2370 | 4650 |

Comparative Example 45

This comparative example illustrates that the silica used as a support for the metal halide catalysts is not an effective catalyst for C5 hydrocarbon resin synthesis.

Polymerization

A 500 milliliter three neck flask was equipped with an overhead stirrer, reflux condenser, gas inlet and outlet ports, a thermometer, and a dropping addition funnel. The flask was charged with 60.0 grams of toluene (reagent grade, Aldrich, Milwaukee, Wis.) and 14.0 grams silica ("EP12" grade, Crosfield Catalysts, Warrington England). Prior to use, the solvent was dried over 4 angstrom molecular sieves. The catalyst slurry was heated to 50° C. with stirring.

Piperylene concentrate (Naphtha Petroleum 3 "Piperylenes", Lyondell Petrochemical Company, Houston, Tex.), 140 grams, was added to the nitrogen purged flask via the dropping addition funnel over 15 minutes. Prior to use, the piperylene concentrate was dried by passing through a column of activated alumina (Fischer 8–16 mesh, 0.3 grams of alumina to 1 milliliter of monomer). The reaction solution was stirred at 50° C. for a total reaction time of one hour.

After completion of the reaction time, the resulting resin solution was separated from the silica by vacuum filtration at room temperature. The volatile materials were removed under reduced pressure at 50° C., no product remained.

EXAMPLES 46–49

These examples serve to illustrate the reuse of a $ZrCl_4$ supported on silica as a catalyst for the polymerization of piperylene concentrate, a C5 monomer feed.

Catalyst Preparation

The silica support material ("EP12" silica from Crosfield Catalysts, Warrington, England) was dried under vacuum, 2–5 mm Hg, using the following thermal cycle, 0.5 hours at room temperature, 1 hour at 35–40° C., 1.5 hours at 100° C., and 2 hours at 150° C. support was added to the reaction flask under an inert atmosphere with zirconium tetrachloride (Aldrich, Milwaukee, Wis.). Loadings for the 10% catalyst were 3 grams $ZrCl_4$ and 27 grams silica and for the 5% catalyst were 3 grams $ZrCl_4$ and 57 grams silica. Toluene, 100 ml, which had been dried over 4 angstrom molecular sieves, was added via syringe to the solids. The catalyst slurry was stirred at ambient temperature for one hour and the solvent removed under vacuum, 2–5 mm Hg, maintaining the temperature near 20° C. Drying the flowable solid continued under vacuum at ambient temperature for 3 hours.

Polymerization

A 500 milliliter three neck flask was equipped with an overhead stirrer, reflux condenser, gas inlet and outlet ports, a thermometer, and a dropping addition funnel. The flask was charged with 70 grams toluene (reagent grade, Aldrich Milwaukee, Wis.) and catalyst as follows. Prior to use, the solvent was dried over 4 angstrom molecular sieves. For the 10% catalyst, 25.6 grams supported catalyst prepared as described above was added. For the 5% catalyst, 51.2 grams supported catalyst prepared as described above was added. Thus, in each case, 2.56 grams $ZrCl_4$, 0.011 moles of the metal chloride was added to the solution. The catalyst slurry was heated to 50° C. with stirring.

Piperylene concentrate (Naphtha Petroleum 3 "Piperylenes", Lyondell Petrochemical Company, Houston, Tex.), 100 grams, was added to the nitrogen purged reaction flask via the dropping funnel over 15 minutes. Prior to use, the piperylene concentrate was dried by passing through a column of activated alumina (Fischer 8–16 mesh, 0.3 grams alumina to 1 milliliter monomer). The reaction solution was stirred at 50° C. for a total reaction time of two hours.

For the recycle examples, the catalyst was allowed to settle and the reaction solution removed from the flask via syringe. The catalyst was washed with 100 milliliters of dry toluene which was also removed from the catalyst via syringe. Additional solvent and monomer was added to the catalyst as described above.

For all of the examples, after completion of the reaction time, catalyst solids were removed from the reaction solution via filtration. The reaction solutions were then quenched with 4 milliliters of $NH_4OH$ in 100 milliliters of water and the water removed using a separatory funnel. The resin solution was then separated from any catalyst salt residues formed during quenching by vacuum filtration at room temperature.

The resin oil was then placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 9.

TABLE 9

| Example | Catalyst | Yield | Softening Point (R&B) | Molecular Weight Mn | Mw | Mz |
| --- | --- | --- | --- | --- | --- | --- |
| 46 | 10% $ZrCl_4/SiO_2$ | 43% | 63° C. | 1890 | 3830 | 8490 |
| 47 | 10% $ZrCl_4/SiO_2$ recycle | 47% | 56° C. | 1940 | 4020 | 8200 |
| 48 | 5% $ZrCl_4/SiO_2$ | 35% | 57° C. | 1450 | 2910 | 6860 |
| 49 | 5% $ZrCl_4/SiO_2$ recycle | 59% | 49° C. | 1440 | 3170 | 7460 |

EXAMPLES 50 AND 51

These examples illustrate the use of a supported aluminum trichloride catalyst on alumina for the polymerization of piperylene concentrate, a C5 monomer feed.
Polymerization A 500 milliliter three neck flask was equipped with an overhead stirrer, reflux condenser, gas inlet and outlet ports, a thermometer, and a dropping addition funnel. The flask was charged with 40 grams toluene (reagent grade, Aldrich Milwaukee, Wis.) and a solid supported aluminum trichloride catalyst, "CAT-59" catalyst (UOP, Des Plains, Ill.) as outlined below.

Prior to use, the solvent was dried over 4 angstrom molecular sieves. Also prior to use, the catalyst was crushed to a powder. All catalyst handling was performed in a nitrogen purged atmosphere. The catalyst slurry was heated to 50° C. with stirring.

Piperylene concentrate (Naphtha Petroleum 3 "Piperylenes", Lyondell Petrochemical Company, Houston, Tex.), 100 grams, was added to the nitrogen purged reaction flask via the dropping addition funnel over 15 minutes. Immediately prior to use, the piperylene concentrate was dried by passing through a column of activated alumina (Fischer 8–16 mesh, 0.3 grams alumina to 1 milliliter monomer). The reaction solution was stirred at 50° C. for a total reaction time of one hour.

Upon completion of the reaction time, the catalyst solids were removed from the reaction solution via filtration. The reaction solutions were then quenched with 4 milliliters of $NH_4OH$ in 100 milliliters of water and the water removed using a separatory funnel. After quenching, the reaction solution was then separated from any catalyst salt residues formed by vacuum filtration at room temperature.

The resulting resin solution was then washed to neutral pH with water and dried over $MgSO_4$ (reagent grade, Aldrich, Milwaukee, Wis.) The resin oil was then placed in a round-bottom flask which was fitted with a distillation head with an adaptor for an inlet tube, thermometer, and attached to a condenser and receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 10.

TABLE 10

| Ex. | Catalyst | Yield | Softening Point (R&B) | Molecular Weight Mn | Mw | Mz |
| --- | --- | --- | --- | --- | --- | --- |
| 50 | 27 wt % "CAT-59" on monomer | 50% | 62° C. | 1510 | 2900 | 5950 |
| 51 | 13.5 wt % "CAT-59" on monomer | 27% | 62° C. | 1640 | 3320 | 6980 |

EXAMPLES 52 AND 53

These examples demonstrate the use of a synthetic supported aluminum trichloride as a catalyst for the polymerization of piperylene concentrate, a C5 monomer feed.
Catalyst Preparation Aluminum chloride (–40 mesh, Vanchlor Co., Inc., Lockport, N.Y.) 7.5 grams (0.06 mol) and the support material, 30 grams "EP12" silica (Crosfield Catalysts, Warrington, England), were combined with 180 milliliters of toluene dried over 4 angstrom molecular sieves (reagent grade, Aldrich, Milwaukee, Wis.). The support material was dried prior to contacting with the aluminum trichloride solution for 2 hours at 40° C., 1 hour at 100° C., and 2 hours at 150° C. all under vacuum. The aluminum trichloride solution was added to the dried support material and the resulting slurry was stirred at room temperature for one hour. The solvent was removed under vacuum at 2–5 mm Hg while maintaining the temperature near 25–30° C. to obtain a flowable powder. The catalyst was stored and handled under an inert atmosphere prior to use.
Polymerization Resins were prepared by the procedures outlined for Examples 50 and 51 above. The resins produced have the properties listed in Table 11.

TABLE 11

| Example | Catalyst | Yield | Softening Point (R&B) | Molecular Weight Mn | Mw | Mz |
| --- | --- | --- | --- | --- | --- | --- |
| 52 | 7.5 wt % $AlCl_3/SiO_2$ on monomer | 21% | 54° C. | 960 | 1330 | 2010 |
| 53 | 3.75 wt % $AlCl_3/SiO_2$ on monomer | 26% | 47° C. | 1030 | 1540 | 2610 |

EXAMPLES 54–58

These examples illustrate the use of zinc chloride on a variety of support materials as solid acid catalysts for the preparation of hydrocarbon resins from C9 unsaturated aromatic hydrocarbon feed stocks.

The supported zinc chloride catalysts were prepared by dissolving 27.3 grams $ZnCl_2$ (Aldrich Milwaukee, Wis.) in 300 grams of methanol (reagent grade, Aldrich, Milwaukee, Wis.). One hundred grams of support was added to the methanol solution and stirred as a slurry for 30 minutes. The support materials used were "F-22" and "F-6" clays (Engelhard Corporation, Iselin, N.J.), "K 10" clay (Sud Chemie/United Catalyst Inc., Louisville, Ky.), and "EP12" silica (Crosfield Catalysts, Warrington, England). The methanol was evaporated from the catalysts on a rotary evaporator under reduced pressure. The catalysts were calcined at 150° C. for 2 hours under a nitrogen purge prior to use.

A 500 milliliter three neck flask was equipped with an overhead stirrer, reflux condenser, gas inlet and outlet ports, thermometer, and a dropping addition funnel. The flask was charged with 50 grams of toluene (reagent grade, Aldrich Milwaukee, Wis.) and 15 wt % of the supported $ZnCl_2$ catalysts described above.

The C9 monomer feed, 100 grams of "LRO-90" (from Lyondell Petrochemicals, Houston, Tex.), was added to the flask via the dropping addition funnel. Immediately prior to use, the monomers and solvent were dried as follows: the C9 monomer feed was dried by passing through a column of activated alumina (Fischer 8–16 mesh, 0.3 grams of alumina to 1 milliliter of monomer). Also immediately prior to use, the toluene was dried over 3 angstrom molecular sieves prior to use.

The reaction solution was heated to a 50° C. reaction temperature. The monomer was added to the reaction flask from the dropping addition funnel at a rate to maintain the desired reaction temperature with external cooling. Monomer addition time was approximately 15 minutes. The reaction solution was stirred at the desired reaction temperature for a total reaction time of 2 hours.

After completion of the reaction time, the resin solution was vacuum filtered from the acid treated clay catalyst at room temperature. The reaction flask and catalyst filter cake were rinsed with approximately 100 milliliters of toluene.

After catalyst filtration, the solvent was removed from the resin solution at 100° C. at 2–5 mm Hg. Also, the resin oil was placed in a round-bottom flask which was fitted with a distillation head with an adaptor for an inlet tube and a thermometer, and attached to a condenser with a receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml of steam condensate was collected. The steam purge was followed by a nitrogen purge at 235° C. to remove water from the remaining resin.

The resins produced have the properties listed in Table 12. Examples 54–57 are in accordance with the present invention, whereas Comparison Example 58 is for comparison purposes.

TABLE 12

| Example | Catalyst | Yield | Softening Point (R&B) | Mn | Mw | Mz |
|---|---|---|---|---|---|---|
| 54 | $ZnCl_2$/F-22 | 29% | 121° C. | 680 | 960 | 1390 |
| 55 | $ZnCl_2$/K 10 | 39% | 101° C. | 540 | 800 | 1230 |
| 56 | $ZnCl_2$/EP12 | 38% | 113° C. | 590 | 850 | 2590 |
| 57 | $ZnCl_2$/F-6 | 40% | 124° C. | 690 | 960 | 1410 |
| 58 | $ZnCl_2$ | 0% | — | — | — | — |

EXAMPLES 59–72

The following examples illustrate the effect on C9 resin properties produced using a supported $ZnCl_2$ catalyst on silica at various reaction temperatures and catalyst loadings.

Catalyst Preparation

Zinc chloride (98% Aldrich, Milwaukee, Wis.), 5.0 grams (0.037 mol), was dissolved in 50 milliliters of methanol (reagent grade, Aldrich, Milwaukee, Wis.). The support material, 13.5 grams, ("EP12" silica from Crosfield Catalysts, Warrington, England which had been calcined at 150° C. under vacuum to remove excess water for the purpose of obtaining an accurate weight of the support) was added to the methanol solution. The slurry was stirred at room temperature for 30 minutes. The solvent was removed on a rotary evaporator at 2–5 mm Hg with mild heating to obtain a flowable powder. The catalyst was calcined at 150° C. under a dry nitrogen purge for 2 hours prior to use.

Polymerization

A 500 milliliter three neck flask was equipped with an overhead stirrer, reflux condenser, gas inlet and outlet ports, thermometer, and a dropping addition funnel. The flask was charged with 50 grams of toluene (reagent grade, Aldrich Milwaukee, Wis.) and a supported $ZnCl_2$ on $SiO_2$ prepared as described above. Prior to use, the toluene was dried over 3 angstrom molecular sieves. The catalyst level for each reaction is described in Table 13 below.

The C9 monomer feed, 100 grams ("LRO-90" from Lyondell Petrochemicals, Houston, Tex.) was added to the dropping addition funnel. Immediately prior to use, the C9 monomer feed was dried by passing through a column of activated alumina (Fischer 8–16 mesh, 0.3 grams alumina to 1 milliliter monomer). The reaction solution was heated to the reaction temperature described in Table 13 below. The monomer solution was added to the reaction flask from the dropping addition funnel at a rate to maintain the desired reaction temperature with external cooling. Monomer addition time was approximately 15 minutes. The reaction solution was stirred at the desired reaction temperature for a total reaction time of 2 hours.

Upon completion of the reaction time, the resin solution was vacuum filtered from the catalyst at room temperature. The reaction flask and catalyst filter cake were rinsed with approximately 100 milliliters of toluene.

After filtration, the resin oil was placed in a round-bottom flask which was fitted with a distillation head with an adaptor for an inlet tube and thermometer and attached to a condenser with a receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml steam condensate was collected. The steam purge was followed by a nitrogen purge at 235° C. to remove water from the remaining resin.

The resins produced have the properties listed in Table 13.

TABLE 13

| Ex. | Catalyst Loading | Reaction Temp. | Yield | Softening Point (R&B) | Mn | Mw | Mz | PD |
|---|---|---|---|---|---|---|---|---|
| 59 | 5 wt % | 100° C. | 41% | 102° C. | 530 | 750 | 1440 | 1.4 |
| 60 | 20 wt % | 60° C. | 38% | 134° C. | 790 | 1220 | 4410 | 1.6 |
| 61 | 5 wt % | 20° C. | 7% | 145° C. | 1010 | 1750 | 3950 | 1.8 |
| 62 | 12.5 wt % | 100° C. | 40% | 107° C. | 620 | 810 | 2040 | 1.3 |
| 63 | 12.5 wt % | 60° C. | 37% | 132° C. | 880 | 1210 | 2100 | 1.4 |
| 64 | 20 wt % | 100° C. | 42% | 105° C. | 620 | 810 | 2730 | 1.3 |
| 65 | 12.5 wt % | 20° C. | 1% | — | 790 | 2450 | 8260 | 3.1 |
| 66 | 5 wt % | 60° C. | 18% | 139° C. | 910 | 1230 | 2210 | 1.4 |
| 67 | 20 wt % | 20° C. | 1% | — | 960 | 2890 | 8040 | 2.8 |
| 68 | 12.5 wt % | 60° C. | 25% | 122° C. | 790 | 1070 | 1950 | 1.4 |
| 69 | 12.5 wt % | 60° C. | 17% | 123° C. | 740 | 960 | 1320 | 1.3 |
| 70 | 5 wt % | 136° C. | 37% | 88° C. | 480 | 600 | 790 | 1.3 |

TABLE 13-continued

| Ex. | Catalyst Loading | Reaction Temp. | Yield | Softening Point (R&B) | Mn | Mw | Mz | PD |
|---|---|---|---|---|---|---|---|---|
| 71 | 12.5 wt % | 136° C. | 41% | 62° C. | 390 | 470 | 580 | 1.2 |
| 72 | 20 wt % | 120° C. | 35% | 80° C. | 490 | 580 | 690 | 1.2 |

EXAMPLES 73–76

The following examples illustrate the effect on C9 resin properties produced using a supported $ZnCl_2$ catalyst on silica at various reaction temperatures and catalyst loadings.

Catalyst Preparation

Zinc chloride (98% Aldrich, Milwaukee, Wis.), 20.0 grams (0.15 mol), was dissolved in 300 milliliters of methanol (reagent grade, Aldrich, Milwaukee, Wis.). The support material, 80 grams, ("EP12" silica from Crosfield Catalysts, Warrington, England) was added to the methanol solution. The slurry was stirred at room temperature for 30 minutes. The solvent was removed on a rotary evaporator at 2–5 mm Hg with mild heating to obtain a flowable powder. The catalyst was calcined for 2 hours at 40° C., 1 hour at 100° C., and 2 hours at 150° C. all under vacuum prior to use.

Polymerization

A 500 milliliter three neck flask was equipped with an overhead stirrer, reflux condenser, gas inlet and outlet ports, thermometer, and a dropping addition funnel. The flask was charged with 100 grams of toluene (reagent grade, Aldrich Milwaukee, Wis.) and a supported $ZnCl_2$ on $SiO_2$ prepared as described above. Prior to use, the toluene was dried over 3 angstrom molecular sieves. The catalyst level for each reaction is described in Table 14 below.

The C9 monomer feed, 100 grams ("LRO-90" from Lyondell Petrochemicals, Houston, Tex.) was added to the dropping addition funnel. Immediately prior to use, the C9 monomer feed was dried by passing through a column of activated alumina (Fischer 8–16 mesh, 0.3 grams alumina to 1 milliliter monomer). The reaction solution was heated to the reaction temperature described in Table 14 below. The monomer solution was added to the reaction flask from the dropping addition funnel at a rate to maintain the desired reaction temperature with external cooling. Monomer addition time was approximately 15 minutes. The reaction solution was stirred at the desired reaction temperature for a total reaction time of 2 hours.

Upon completion of the reaction time, the resin solution was vacuum filtered from the catalyst at room temperature. The reaction flask and catalyst filter cake were rinsed with approximately 100 milliliters of toluene.

After filtration, the resin oil was placed in a round-bottom flask which was fitted with a distillation head with an adaptor for an inlet tube and thermometer and attached to a condenser with a receiving flask. The resin oil was heated to 235° C. with a nitrogen purge followed by a steam purge at 235–245° C. to remove light oil products. The steam purge was continued until less than 1 ml of oil was collected per 100 ml of steam condensate or until 1000 ml steam condensate was collected. The steam purge was followed by a nitrogen purge at 235° C. to remove water from the remaining resin.

The resulting resins had the properties listed in Table 14.

TABLE 14

| Ex. | Catalyst Loading | Reaction Temp. | Yield | Softening Point (R&B) | Mn | Mw | Mz | PD |
|---|---|---|---|---|---|---|---|---|
| 73 | 10 wt % | 50° C. | 37% | 134° C. | 830 | 1280 | 2040 | 1.5 |
| 74 | 5 wt % | 50° C. | 21% | 144° C. | 890 | 1380 | 2260 | 1.6 |
| 75 | 10 wt % | 100° C. | 28% | 126° C. | 690 | 920 | 1320 | 1.3 |
| 76 | 10 wt % | 50° C. | 35% | 141° C. | 850 | 1230 | 1890 | 1.5 |

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A process for making a hydrocarbon resin, comprising: polymerizing a feed stream comprising pure monomer selected from the group consisting of styrene, alpha-methyl styrene, beta-methyl styrene, 4-methyl styrene, and vinyl toluene fractions in the presence of a supported Lewis acid metal halide solid acid catalyst wherein the Lewis acid comprises at least one member selected from the group consisting of $ZnCl_2$, $AlCl_3$, $AlBr_3$, $BF_3$, $BCl_3$, $FeCl_3$, $SnCl_4$, $TiCl_4$, $ZrCl_4$, $HfCl_4$, $BiCl_3$, and lanthanide halides, wherein substantially all freely-associated water has been removed from the supported metal halide solid acid catalyst; and producing a hydrocarbon resin having a number average molecular weight (Mn) ranging from 400 to 2000, a weight average molecular weight (Mw) ranging from about 500 to 5000, a Z average molecular weight (Mz) ranging from about 500 to 10,000, and a polydispersity (PD) as measured by Mw/Mn between 1.2 and 3.5, where Mn, Mw, and Mz are determined by size exclusion chromatography (SEC).

2. The process of claim 1, wherein water removal from the supported metal halide solid acid catalyst comprises calcining at a temperature up to about 700° C.

3. The process of claim 1, wherein the supported metal halide comprises a metal halide and a support, and wherein substantially all freely-associated water has been removed from the support before the support is combined with the metal halide.

4. The process of claim 1, wherein the supported metal halide solid acid catalyst comprises Lewis acid on clay, and wherein the Lewis acid comprises at least one member selected from the group consisting of $ZnCl_2$, $AlCl_3$, $AlBr_3$, $BF_3$, $BCl_3$, $FeCl_3$, $SnCl_4$, $TiCl_4$, $ZrCl_4$, $HfCl_4$, $BiCl_3$, and lanthanide halides.

5. The process of claim 1, wherein the supported metal halide catalyst comprises Lewis acid on silica.

6. The process of claim 1, wherein the supported metal halide solid acid catalyst comprises Lewis acid on silica-alumina, and wherein the Lewis acid comprises at least one member selected from the group consisting of $ZnCl_2$, $AlCl_3$, $BF_3$, $BCl_3$, $FeCl_3$, $SnCl_4$, $TiCl_4$, $ZrCl_4$, $HfCl_4$, $BiCl_3$, and lanthanide halides.

7. The process of claim 1, wherein the supported metal halide catalyst comprises Lewis acid on mesoporous silica, and wherein the Lewis acid comprises at least one member selected from the group consisting of $ZnCl_2$, $AlCl_3$, $BF_3$, BCl$_3$, FeCl$_3$, SnCl$_4$, TiCl$_4$, ZrCl$_4$, HfCl$_4$, BiCl$_3$, and lanthanide halides.

8. The process of claim 1, wherein the supported metal halide catalyst comprises Lewis acid on mesoporous silica-alumina, and wherein the Lewis acid comprises at least one member selected from the group consisting of ZnCl$_2$, AlCl$_3$, BF$_3$, BCl$_3$, FeCl$_3$, SnCl$_4$, TiCl$_4$, ZrCl$_4$, HfCl$_4$, BiCl$_3$, and lanthanide halides.

9. The process of claim 1, wherein the supported metal halide solid acid catalyst comprises Lewis acid on ion exchange resin, and wherein the Lewis acid comprises at least one member selected from the group consisting of ZnCl$_2$, AlCl$_3$, BF$_3$, BCl$_3$, FeCl$_3$, SnCl$_4$, TiCl$_4$, ZrCl$_4$, HfCl$_4$, BiCl$_3$, and lanthanide halides.

10. The process of claim 1, wherein the supported metal halide solid acid catalyst comprises Lewis acid on zeolite, and wherein the Lewis acid comprises at least one member selected from the group consisting of ZnCl$_2$, AlC$_3$, BF$_3$, BCl$_3$, FeCl$_3$, SnCl$_4$, TiCl$_4$, ZrCl$_4$, HfCl$_4$, BiCl$_3$, and lanthanide halides, and wherein the zeolite comprises at least one member selected from the group consisting of zeolite Y, zeolite β, MFI, MEL, NaX, NaY, faujasite, and mordenite.

11. The process of claim 1, wherein the supported metal halide solid acid catalyst comprises polymer grafted aluminum halide.

12. The process of claim 1, wherein the feed stream is contacted with about 0.1 wt % to 30 wt % of the supported metal halide solid acid catalyst based on monomer weight in a batch reactor.

13. The process of claim 1, wherein the supported metal halide solid acid catalyst is added to the feed stream.

14. The process of claim 1, wherein the feed stream is added to a slurry of the supported metal halide solid acid catalyst in solvent.

15. The process of claim 1, wherein the feed stream is polymerized at a reaction temperature between about −50° C. and 150° C.

16. A process for making a hydrocarbon resin, comprising:
polymerizing a feed stream comprising pure monomer in the presence of ZrCl$_4$, wherein pure monomer comprises at least one member selected from the group consisting of styrene, alpha-methyl styrene, beta-methyl styrene, 4-methyl styrene, and vinyl toluene fractions, and producing a hydrocarbon resin having a number average molecular weight (Mn) ranging from 400 to 2000, a weight average molecular weight (Mw) ranging from about 500 to 5000, a Z average molecular weight (Mz) ranging from about 500 to 10,000, and a polydispersity (PD) as measured by Mw/Mn between 1.2 and 3.5, where Mn, Mw, and Mz are determined by size exclusion chromatography (SEC).

17. The process of claim 16, wherein the feed stream is contacted with about 0.1 wt % to 30 wt % of the ZrCl$_4$ based on monomer weight in a batch reactor.

18. The process of claim 16, wherein the ZrCl$_4$ is added to the feed stream.

19. The process of claim 16, wherein the feed stream is added to a slurry of the ZrCl$_4$ in solvent.

20. The process of claim 16, wherein the feed stream is polymerized at a reaction temperature between about −50° C. and 150° C.

* * * * *